US009584757B2

(12) United States Patent
Margulis

(10) Patent No.: US 9,584,757 B2
(45) Date of Patent: *Feb. 28, 2017

(54) APPARATUS AND METHOD FOR EFFECTIVELY IMPLEMENTING A WIRELESS TELEVISION SYSTEM

(75) Inventor: Neal Margulis, Woodside, CA (US)

(73) Assignee: Sling Media, Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/194,834

(22) Filed: Jul. 29, 2011

(65) Prior Publication Data
US 2012/0030718 A1 Feb. 2, 2012

Related U.S. Application Data

(60) Continuation of application No. 12/758,196, filed on Apr. 12, 2010, now Pat. No. 7,992,176, which is a
(Continued)

(51) Int. Cl.
H04N 21/4402 (2011.01)
H04N 7/10 (2006.01)
(Continued)

(52) U.S. Cl.
CPC ......... H04N 7/106 (2013.01); H04L 12/2812 (2013.01); H04N 5/38 (2013.01);
(Continued)

(58) Field of Classification Search
CPC ......... H04N 21/4122; H04N 21/43637; H04N 21/42607; H04N 21/2343–21/23439;
(Continued)

(56) References Cited

U.S. PATENT DOCUMENTS 3,416,043 A 12/1968 Jorgensen
4,254,303 A 3/1981 Takizawa
(Continued)

FOREIGN PATENT DOCUMENTS

CA 2286641 A1 10/1998
CA 2324856 A1 5/2001
(Continued)

OTHER PUBLICATIONS

China State Intellectual Property Office "Third Office Action" issued Dec. 5, 2012 for Chinese Patent Appln. No. 200680022520.6.
(Continued)

Primary Examiner — Robert Hance
(74) Attorney, Agent, or Firm — LK Global

(57) ABSTRACT

An apparatus and method for effectively implementing a wireless television system may include a communications processor and a transmitter device that combine at least one of a local-area network interface, a wide-area network interface, and one or more television data interfaces for effectively performing a wireless network transmission process. A transmitted stream from the wireless television system may be received via wireless network processing for viewing local-area network data, wide-area network data (such as Internet data), or television data by flexibly utilizing various electronic devices such as a notepad personal computer, a personal digital assistant (PDA), or a handheld TV remote control device.

20 Claims, 9 Drawing Sheets

Related U.S. Application Data division of application No. 09/809,868, filed on Mar. 15, 2001, now Pat. No. 7,725,912, which is a continuation of application No. 09/318,904, filed on May 26, 1999, now Pat. No. 6,263,503.

(51) Int. Cl.

| | | |
|---|---|---|
| *H04N 21/2343* | (2011.01) | |
| *H04L 12/28* | (2006.01) | |
| *H04N 5/38* | (2006.01) | |
| *H04N 5/44* | (2011.01) | |
| *H04N 21/41* | (2011.01) | |
| *H04N 21/436* | (2011.01) | |
| *H04N 21/4363* | (2011.01) | |
| *H04N 5/45* | (2011.01) | |
| *H04N 21/462* | (2011.01) | |

(52) U.S. Cl.
CPC ... *H04N 5/4401* (2013.01); *H04N 21/234309* (2013.01); *H04N 21/4122* (2013.01); *H04N 21/43615* (2013.01); *H04N 21/43637* (2013.01); *H04N 21/4402* (2013.01); *H04N 21/440218* (2013.01); *H04L 12/2829* (2013.01); *H04L 12/2838* (2013.01); *H04L 2012/2841* (2013.01); *H04L 2012/2849* (2013.01); *H04N 5/45* (2013.01); *H04N 21/4622* (2013.01)

(58) Field of Classification Search
CPC ..... H04N 21/43615; H04N 21/234309; H04N 21/234363; H04N 21/4402; H04N 21/440218
USPC ..................................................... 725/80–82
See application file for complete search history.

(56) References Cited

U.S. PATENT DOCUMENTS

| | | |
|---|---|---|
| 5,132,992 A | 7/1992 | Yurt et al. |
| 5,161,021 A | 11/1992 | Tsai |
| 5,237,648 A | 8/1993 | Mills et al. |
| 5,293,357 A | 3/1994 | Hallenbeck |
| 5,321,846 A | 6/1994 | Yokota et al. |
| 5,377,332 A * | 12/1994 | Entwistle ............... G06F 13/362 710/117 |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,537,530 A | 7/1996 | Edgar et al. |
| 5,541,852 A | 7/1996 | Eyuboglu et al. |
| 5,602,589 A | 2/1997 | Vishwanath et al. |
| 5,623,312 A | 4/1997 | Yan et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,870,146 A | 2/1999 | Zhu |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,969,764 A | 10/1999 | Sun et al. |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,023,233 A | 2/2000 | Craven et al. |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,044,396 A | 3/2000 | Adams |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,289,485 B1 | 9/2001 | Shiomoto |
| 6,310,886 B1 | 10/2001 | Barton |
| 6,340,994 B1 | 1/2002 | Margulis et al. |
| 6,356,945 B1 | 3/2002 | Shaw et al. |
| 6,359,902 B1 * | 3/2002 | Putzolu ............... H04N 7/17318 370/466 |
| 6,370,688 B1 | 4/2002 | Hejna, Jr. |
| 6,434,113 B1 | 8/2002 | Gubbi |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 * | 12/2002 | Humpleman ...... H04Q 11/0478 348/E5.002 |
| 6,496,122 B2 | 12/2002 | Sampsell |
| 6,505,160 B1 | 1/2003 | Levy et al. |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,597,375 B1 | 7/2003 | Yawitz |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,277 B1 | 6/2004 | Shaffer et al. |
| 6,757,851 B1 | 6/2004 | Park et al. |
| 6,757,906 B1 | 6/2004 | Look et al. |
| 6,766,376 B2 | 7/2004 | Price |

(56) References Cited

U.S. PATENT DOCUMENTS

| | | |
|---|---|---|
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Maasud et al. |
| 6,788,882 B1 | 9/2004 | Geer et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,898,583 B1 | 5/2005 | Rising, III |
| 6,910,175 B2 | 6/2005 | 'Krishnamachari |
| 6,927,685 B2 | 8/2005 | Wathen |
| 6,930,661 B2 | 8/2005 | Uchida et al. |
| 6,941,575 B2 | 9/2005 | Allen |
| 6,944,621 B1 | 9/2005 | Collart |
| 6,944,880 B1 | 9/2005 | Allen |
| 6,952,595 B2 | 10/2005 | Ikedo et al. |
| 6,970,602 B1* | 11/2005 | Smith ............ H04N 21/234336 375/E7.137 |
| 6,981,050 B1 | 12/2005 | Tobias et al. |
| 6,983,057 B1 | 1/2006 | Ho et al. |
| 6,985,932 B1 | 1/2006 | Glaser et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,099,951 B2 | 8/2006 | Laksono |
| 7,103,905 B2 | 9/2006 | Novak |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | Dacosta |
| 7,382,729 B2 | 6/2008 | Honda et al. |
| 7,464,396 B2 | 12/2008 | Hejna, Jr. |
| 7,502,733 B2 | 3/2009 | Andrsen et al. |
| 7,505,480 B1 | 3/2009 | Zhang et al. |
| 7,565,681 B2 | 7/2009 | Ngo et al. |
| 7,577,978 B1 | 8/2009 | Wistendahl et al. |
| 7,583,676 B2 | 9/2009 | Shobatake |
| 7,616,955 B2 | 11/2009 | Kim |
| 7,720,432 B1 | 5/2010 | Colby et al. |
| 7,725,912 B2 | 5/2010 | Margulis |
| 7,788,696 B2 | 8/2010 | Burges et al. |
| 7,913,278 B2 | 3/2011 | Ellis et al. |
| 7,921,446 B2 | 4/2011 | Krikorian et al. |
| 7,975,062 B2 | 7/2011 | Krikorian et al. |
| 8,060,906 B2 | 11/2011 | Begeja et al. |
| 8,266,657 B2 | 9/2012 | Margulis |
| 8,346,605 B2 | 1/2013 | Krikorian et al. |
| 8,352,991 B2 | 1/2013 | Cahnbley et al. |
| 8,365,236 B2 | 1/2013 | Krikorian et al. |
| 8,621,533 B2 | 12/2013 | Krikorian et al. |
| 8,799,969 B2 | 8/2014 | Krikorian et al. |
| 8,819,750 B2 | 8/2014 | Krikorian et al. |
| 9,106,723 B2 | 8/2015 | Krikorian et al. |
| 2001/0004733 A1 | 6/2001 | Eldering |
| 2001/0007097 A1 | 7/2001 | Kim |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0019984 A1 | 2/2002 | Rakib |
| 2002/0032907 A1 | 3/2002 | Daniels |
| 2002/0046404 A1 | 4/2002 | Mizutani |
| 2002/0053053 A1 | 5/2002 | Nagai et al. |
| 2002/0083009 A1 | 6/2002 | Lansing et al. |
| 2002/0090029 A1 | 7/2002 | Kim |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143973 A1 | 10/2002 | Price |
| 2002/0147687 A1 | 10/2002 | Breiter et al. |
| 2002/0151992 A1 | 10/2002 | Hoffberg et al. |
| 2002/0154892 A1 | 10/2002 | Hoshen et al. |
| 2002/0191575 A1 | 12/2002 | Kalavade et al. |
| 2002/0196853 A1* | 12/2002 | Liang .................... H04N 19/61 375/240.16 |
| 2003/0001016 A1 | 1/2003 | Fraier et al. |
| 2003/0001846 A1 | 1/2003 | Davis et al. |
| 2003/0027556 A1 | 2/2003 | Kobayashi |
| 2003/0028643 A1 | 2/2003 | Jabri |
| 2003/0028873 A1 | 2/2003 | Lemmons |
| 2003/0030752 A1 | 2/2003 | Begeja et al. |
| 2003/0070167 A1 | 4/2003 | Holtz et al. |
| 2003/0078973 A1 | 4/2003 | Przekop et al. |
| 2003/0088686 A1 | 5/2003 | Jennings |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0220905 A1 | 11/2003 | Amado et al. |
| 2003/0231621 A1 | 12/2003 | Gubbi et al. |
| 2003/0231655 A1 | 12/2003 | Kelton et al. |
| 2003/0231868 A1 | 12/2003 | Herley |
| 2003/0234803 A1 | 12/2003 | Toyama et al. |
| 2004/0003406 A1 | 1/2004 | Billmaier |
| 2004/0032916 A1 | 2/2004 | Takashima |
| 2004/0049791 A1* | 3/2004 | Shah et al. ........ 725/82 |
| 2004/0068536 A1 | 4/2004 | Demers et al. |
| 2004/0083301 A1 | 4/2004 | Murase et al. |
| 2004/0098748 A1 | 5/2004 | Bo et al. |
| 2004/0100486 A1 | 5/2004 | Flamini et al. |
| 2004/0101271 A1 | 5/2004 | Boston et al. |
| 2004/0139047 A1 | 7/2004 | Rechsteiner et al. |
| 2004/0153951 A1 | 8/2004 | Walker et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0177063 A1 | 9/2004 | Weber et al. |
| 2004/0205830 A1 | 10/2004 | Kaneko |
| 2004/0212640 A1 | 10/2004 | Mann et al. |
| 2004/0215458 A1 | 10/2004 | Kobayashi et al. |
| 2004/0216173 A1 | 10/2004 | Horoszowski et al. |
| 2004/0220791 A1 | 11/2004 | Lamkin et al. |
| 2004/0220926 A1 | 11/2004 | Lamkin et al. |
| 2004/0236844 A1 | 11/2004 | Kocherlakota |
| 2004/0246936 A1 | 12/2004 | Perlman |
| 2004/0254887 A1 | 12/2004 | Jacoby |
| 2004/0255249 A1 | 12/2004 | Chang et al. |
| 2005/0021398 A1 | 1/2005 | McCleskey et al. |
| 2005/0021830 A1 | 1/2005 | Urzaiz et al. |
| 2005/0027821 A1 | 2/2005 | Alexander et al. |
| 2005/0044058 A1 | 2/2005 | Matthews et al. |
| 2005/0091683 A1 | 4/2005 | Sheynman et al. |
| 2005/0165795 A1 | 7/2005 | Myka et al. |
| 2005/0172028 A1 | 8/2005 | Nilsson et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0246369 A1 | 11/2005 | Oreizy et al. |
| 2005/0246738 A1 | 11/2005 | Lockett et al. |
| 2005/0251833 A1 | 11/2005 | Schedivy |
| 2005/0262534 A1 | 11/2005 | Bontempi et al. |
| 2005/0283791 A1 | 12/2005 | McCarthy et al. |
| 2005/0288999 A1 | 12/2005 | Lerner et al. |

(56) References Cited

U.S. PATENT DOCUMENTS

| | | |
|---|---|---|
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0101499 A1 | 5/2006 | Aravamudan et al. |
| 2006/0117371 A1 | 6/2006 | Margulis |
| 2006/0156219 A1 | 7/2006 | Haot et al. |
| 2006/0156374 A1 | 7/2006 | Hu et al. |
| 2006/0184980 A1 | 8/2006 | Cole |
| 2006/0287916 A1 | 12/2006 | Starr et al. |
| 2007/0003224 A1 | 1/2007 | Krikorian et al. |
| 2007/0022328 A1 | 1/2007 | Tarra et al. |
| 2007/0053446 A1 | 3/2007 | Spilo |
| 2007/0076604 A1 | 4/2007 | Litwack |
| 2007/0097257 A1 | 5/2007 | El-Maleh et al. |
| 2007/0127437 A1 | 6/2007 | Ozawa |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0260462 A1 | 11/2007 | Andersen et al. |
| 2008/0019276 A1 | 1/2008 | Takatsuji et al. |
| 2008/0059533 A1 | 3/2008 | Krikorian |
| 2008/0134267 A1 | 6/2008 | Moghe et al. |
| 2008/0199150 A1 | 8/2008 | Candelore |
| 2008/0256485 A1 | 10/2008 | Krikorian |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0080448 A1 | 3/2009 | Tarra et al. |
| 2009/0102983 A1 | 4/2009 | Malone et al. |
| 2009/0103607 A1 | 4/2009 | Bajpai et al. |
| 2009/0157697 A1 | 6/2009 | Conway et al. |
| 2009/0177758 A1 | 7/2009 | Banger et al. |
| 2009/0199248 A1 | 8/2009 | Ngo et al. |
| 2009/0252219 A1 | 10/2009 | Chen et al. |
| 2009/0300205 A1 | 12/2009 | Jabri |
| 2010/0001960 A1 | 1/2010 | Williams |
| 2010/0064055 A1 | 3/2010 | Krikorian et al. |
| 2010/0064332 A1 | 3/2010 | Krikorian et al. |
| 2010/0070925 A1 | 3/2010 | Einaudi et al. |
| 2010/0071076 A1 | 3/2010 | Gangotri et al. |
| 2010/0100915 A1 | 4/2010 | Krikorian et al. |
| 2010/0191860 A1 | 7/2010 | Krikorian et al. |
| 2010/0192184 A1 | 7/2010 | Margulis |
| 2010/0192185 A1 | 7/2010 | Margulis |
| 2013/0185163 A1 | 7/2013 | Krikorian et al. |

FOREIGN PATENT DOCUMENTS

| | | |
|---|---|---|
| CN | 1464685 A | 12/2003 |
| EP | 0515101 A2 | 11/1992 |
| EP | 0690626 A2 | 1/1996 |
| EP | 0838945 A | 4/1998 |
| EP | 1691550 A | 8/2006 |
| EP | 1830558 A1 | 9/2007 |
| GB | 2307151 A | 5/1997 |
| JP | 11289350 A | 10/1999 |
| JP | 2003046582 A | 2/2003 |
| JP | 2003101547 A | 4/2003 |
| JP | 2003114845 A | 4/2003 |
| JP | 2003179580 A | 6/2003 |
| JP | 2004007127 A | 1/2004 |
| JP | 2004072686 A | 3/2004 |
| JP | 2005032120 | 2/2005 |
| JP | 2005039781 A | 2/2005 |
| KR | 20010211410 A | 8/2001 |
| KR | 19990082855 A | 2/2010 |
| TW | 200703018 A | 1/2007 |
| WO | 9837701 | 8/1998 |
| WO | 0072596 A1 | 11/2000 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2004045218 A1 | 5/2004 |
| WO | 2005122025 A2 | 12/2005 |
| WO | 2006074110 A | 7/2006 |

OTHER PUBLICATIONS

European Patent Office "Extgended Search Report" dated Nov. 27, 2011 for European Patent Appln. No. 12187858.1.
USPTO "Notice of Allowance" mailed Sep. 25, 2012 for U.S. Appl. No. 13/240,932, filed Sep. 22, 2011.
USPTO "Non-Final Office Action" mailed Feb. 24, 2012; U.S. Appl. No. 13/240,932, filed Sep. 22, 2011.
China Intellectual Property Office, "Second Office Action" mailed Feb. 15, 2012; Appln. No. CN200680022520.6.
China State Intellectual Property Office, "Reexamination Office Action" mailed Mar. 5, 2012; Chinese Appln. No. 200580026825.X.
USPTO "Non-Final Office Action" dated Mar. 11, 2013 for U.S. Appl. No. 13/079,644.
China State Intellectual Property Office "Fourth Office Action" dated Mar. 5, 2013 for Chinese Patent Appln. No. 200810161874.X.
USPTO "Non-Final Office Action" dated Mar. 5, 2013 for U.S. Appl. No. 13/107,341.
European Patent Office Supplementary Search Report dated Mar. 6, 2013 for European Patent Appln. No. 05758509.3.
Intellectual Property Office "Office Action" dated Feb. 25, 2013 for Taiwan Patent Appln. No. 098146025.
Japanese Patent Office "Decision of Rejection (Final Rejection)" dated Jan. 29, 2013 for Japanese Patent Appln. No. 2008-507651.
Chinese Intellectual Property Office "Office Action" mailed Apr. 10, 2012 for Chinese Application 200810126554.0.
Japan Patent Office "Office Action" mailed Feb. 28, 2012 for Japanese Application P2008-507651.
Canadian Intellectual Property Office "Office Action" mailed on Feb. 16, 2012 for Canadian Application 2,660,350.
Taiwan Intellectual Property Office "Office Action" mailed Feb. 23, 2012 for Taiwan Application 097137393.
USPTO "Final Office Action" mailed Apr. 27, 2012; U.S. Appl. No. 12/347,465, filed Dec. 31, 2008.
USPTO "Non-Final Office Action" mailed Jan. 10, 2012; U.S. Appl. No. 12/827,964, filed Jun. 30, 2010.
Chinese Office Action, dated Dec. 31, 2011, for Chinese Patent Application No. 200810161874.X.
European Office Action, dated Nov. 30, 2011, for European Patent Application No. 06 734 554.6-2223.
Japan Patent Office "Hearing" mailed Apr. 24, 2012 for Japanese Patent Appln. No. 2007-527683.
Japan Patent Office "Hearing" mailed Apr. 24, 2012 for Japanese Patent Appln. No. 2007-268269.
European Patent Office "Office Action" dated Aug. 7, 2012 for European Patent Appln. No. 06 734 554.6.
China Patent Office "Office Action" issued Aug. 3, 2012 for Chinese Patent Appln. No. 200810161874.X.
USPTO "Notice of Allowance" mailed Aug. 31, 2012 for U.S. Appl. No. 11/620,711, filed Jan. 7, 2007.
M2 Presswire, Aug. 16, 2006, OTCPicks.com; Daily Market Movers Digest Midday Stock Alerts for Wednesday, Aug. 16, AMRU, IPTM, BCLC, IHDR, EGIL © 1994-2006 M2 Communications LTD.
USPTO "Notice of Allowance" mailed Jun. 12, 2012 for U.S. Appl. No. 13/240,932, filed Sep. 22, 2011.
USPTO "Final Office Action" mailed Jun. 6, 2012 for U.S. Appl. No. 12/827,964, filed Jun. 20, 2010.
USPTO "Notice of Allowance" mailed Jul. 6, 2012 for U.S. Appl. No. 11/111,265, filed Apr. 21, 2005.

(56) References Cited

OTHER PUBLICATIONS

USPTO "Non-Final Office Action" mailed Oct. 23, 2012 for U.S. Appl. No. 13/194,783, filed Jul. 29, 2011.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html.]
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2014.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
China State Intellectual Property Office "Office Action" issued Mar. 18, 2010, for Application No. 200680022520.6.
Canadian Intellectual Property Office "Office Action" mailed Feb. 18, 2010 for Application No. 2569610.
China State Intellectual Property Office "Office Action," issued Apr. 13, 2010; Application No. 200580026825.X.
China State Intellectual Property Office "First Office Action," issued Jul. 31, 2009, for Application No. 200580026825.X.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
USPTO, Non-Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
USPTO Non-Final Office Action mailed Aug. 11, 2010; U.S. Appl. No. 11/111,265, filed Apr. 21, 2005.
USPTO Final Office Action mailed Sep. 24, 2010; U.S. Appl. No. 11/620,707, filed Jan. 7, 2007.
USPTO Non-Final Office Action mailed Sep. 30, 2010; U.S. Appl. No. 12/758,193, filed Apr. 12, 2010.
USPTO Non-Final Office Action mailed Sep. 29, 2010; U.S. Appl. No. 12/758,194, filed Apr. 12, 2010.
USPTO Non-Final Office Action mailed Oct. 4, 2010; U.S. Appl. No. 12/643,812, filed Dec. 21, 2009.
Japan Patent Office "Notice of Grounds for Rejection (Office Action)," mailed May 25, 2010; Patent Application No. 2007-527683.
Japan Patent Office "Notice of Grounds for Rejection (Office Action)," mailed May 25, 2010; Patent Application No. 2007-0268269.
China State Intellectual Property Office "Second Office Action of China State Intellectual Property Office," issued Aug. 26, 2010; Application No. 200810126554.0.
European Patent Office "EPO Communication" dated Nov. 29, 2010; Application No. 08 167 880.7-2202.
China Patent Office "Office Action" mailed Feb. 23, 2011; Chinese Patent Appln. No. 200680022520.6.
China Patent Office "Office Action" mailed Jan. 6, 2911; Chinese Patent Appln. No. 200810126554.0.
Australian Government "Office Action," Australian Patent Application No. 2006240518, mailed Nov. 12, 2009.
USPTO "Non-Final Office Action" mailed Mar. 4, 2011; U.S. Appl. No. 12/757,697, filed Apr. 9, 2010.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
Newton's Telecom Dictionary, 21st ed., Mar. 2005.
USPTO "Final Office Action" mailed Mar. 10, 2011; U.S. Appl. No. 11/111,265, filed Apr. 21, 2005.
Canadian Patent Office "Office Action" mailed Mar. 17, 2011; Canadian Patent Appln. No. 2,606,235.
Sikora, Thomas "Trends and Perspectives in Image and Video Coding," Proceedings of the IEEE, vol. 93 No. 1, pp. 6-17, Jan. 1, 2005.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
Vetro, Anthony et al. "Video Transcoding Architectures and Techniques: An Overview," IEEE Signal Processing Magazine, vol. 20, No. 2, pp. 18-29, Mar. 1, 2003.
De Lattre, Alexis et al. "VideoLAN Streaming Howto," Internet Citation, Jan. 22, 2005; http://www.videolan.org/doc/streaming-howto/en/.
"The Authoritative Dictionary of IEEE Standard Terms," 7th ed. 2000.
The International Bureau of WIPO "International Preliminary Report on Patentability" mailed Jul. 14, 2011; International Appln. No. PCT/US2009/068468, filed Dec. 17, 2009.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
European Patent Office "Extended European Search Report" dated Feb. 28, 2011; Appln. No. 06734554.
Japan Patent Office "Decision of Rejection (Final Rejection)" mailed Mar. 15, 2011; Patent Appln. No. 2007-527683.

(56) References Cited

OTHER PUBLICATIONS

USPTO "Non-Final Office Action" mailed Jun. 28, 2011; U.S. Appl. No. 12/339,878, filed Dec. 19, 2008.
USPTO "Non-Final Office Action" mailed Sep. 16, 2011; U.S. Appl. No. 11/111,265, filed Apr. 21, 2005.
Australian Government "Notice of Acceptance" mailed Aug. 10, 2011; Patent Appln. No. 2006240518.
Srisuresh, P. et al. "Traditional IP Network Address Translator (Traditional NAT)," Network Working Group, The Internet Society, Jan. 2001.
USPTO "Non-Final Office Action" mailed Sep. 6, 2011; U.S. Appl. No. 12/347,465, filed Dec. 31, 2008.
China State Intellectual Property Office "First Office Action," Jan. 8, 2010; Application No. 200810126554.0.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
USPTO "Notice of Allowance" mailed Sep. 22, 2011; U.S. Appl. No. 12/979,145, filed Dec. 27, 2010.
Newton's Telcom Dictionary, 20th ed., Mar. 2004.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL: http://www/mythtv.org/wiki?title=User_Manual:Introduction&oldid=25549>.
Japan Patent Office "Notice of Grounds for Rejection (Office Action)" mailed Jun. 28, 2011; Japanese Patent Appln. No. P2008-507651.
USPTO "Notice of Allowance", mailed Oct. 18, 2011; U.S. Appl. No. 12/339,878, filed Dec. 19, 2008.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809.868, filed Mar. 15, 2001.
USPTO, Non-Final Office Action mailed May 1, 2008; U.S. Appl. No. 11/111,265, filed Apr. 21, 2005.

USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
Microsoft Corporation; Harman/Kardon "Master Your Universe" 1999.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Matsushita Electric Corporation of America MicroCast : Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
European Patent Office, International Searching Authority, "International Search Report," mailed Mar. 30, 2010; International Application PCT/US2009/068468 filed Dec. 27, 2009.
USPTO Non-Final Office Action mailed Mar. 31, 2010; U.S. Appl. No. 11/620,707, filed Jan. 7, 2007.
Uspto Non-Final Office Action mailed Mar. 19, 2010; U.S. Appl. No. 11/147,664, filed Jun. 7, 2005.
USPTO Final Office Action mailed Mar. 12, 2010; U.S. Appl. No. 11/620,711, filed Jan. 7, 2007.
USPTO Final Office Action mailed Mar. 3, 2010; U.S. Appl. No. 11/111,265, filed Apr. 21, 2005.
Sony Corporation "LocationFree Player Pak—LocationFree Base Station—LocationFree Player" [Online] 2005, XP002512401; retrieved from the Internet: <URL:http://www.docs.sony.com/release/LFPK1.pdf; retrieved on Jan. 28, 2009.
Canadian Intellectual Property Office "Office Action" mailed Nov. 28, 2011; Canadian Patent Appln. No. 2,606,235.
Eurpoean Patent Office, Examination Report, dated Sep. 6, 2013 for European Patent Application No. 12 187 858.1.
Canadian Intellectual Property Office, Office Action, dated Sep. 3, 2013 for Canadian Patent Application No. 2,660,350.
European Patent Office, Examination Report, dated Jul. 25, 2013 for European Patent Application No. 05 758 509.3.
China State Intellectual Property Office, First Office Action, dated Aug. 2, 2013 for Chinese Patent Application No. 200980151308.3.
USPTO, Final Office Action, dated Sep. 19, 2013 for U.S. Appl. No. 13/107,341.
USPTO, Notice of Allowance, dated Sep. 20, 2013 for U.S. Appl. No. 13/079,644.
China State Intellectual Property Office, Office Action, dated Sep. 29, 2013 for Chinese Patent Application No. 200810161874.X.
USPTO, Final Office Action mailed May 8, 2013 for U.S. Appl. No. 13/194,783.
USPTO, Office Action mailed Jun. 19, 2013 for U.S. Appl. No. 12/827,964.
USPTO, Office Action mailed Jun. 20, 2013 for U.S. Appl. No. 13/615,306.
USPTO, Final Office Action mailed Jul. 17, 2013 for U.S. Appl. No. 13/079,644.

(56) References Cited

OTHER PUBLICATIONS

China State Intellectual Property Office, Office Action, dated Jul. 1, 2013 for China Patent Appln. No. 200680022520.
European Patent Office, Extended Search Report mailed May 24, 2013 for European Patent Application No. 07814265.0.
USPTO, Non-Final Office Action, dated Aug. 7, 2013 for U.S. Appl. No. 13/609,033.
Japan Patent Office, Hearing, dated Aug. 13, 2013 for Japanese Patent Application No. P2008-507651.
Canadian Intellectual Property Office, Office Action, dated Sep. 30, 2013 for Canada Patent Application No. 2,747,539.
US Patent and Trademark Office, Non-Final Office Action, dated Jan. 6, 2014 for U.S. Appl. No. 13/615,306.
US Patent and Trademark Office, Non-Final Office Action, dated Jan. 6, 2014 for U.S. Appl. No. 12/827,964.
European Patent Office, Summons to Oral Proceedings, dated Jan. 15, 2014 for European Patent Application No. 06734554.6.
Li Zhuo et al., Adaptive Forward Error Correction for Streaming Stored MPEG-4 FGS Video Over Wireless Channel, IEEE 5th Workshop on Signal Processing Advances in Wireless Communications, 2004, Jan. 1, 2004, pp. 26-30, XP055091312.
Government of India Patent Office, Office Action, dated Jan. 18, 2014 for India Patent Application No. 921/CHENP/2009.
Japan Patent Office, Notice of Ground(s) for Rejection, dated Feb. 18, 2014 for Japan Patent Application No. P2008-507651.
Government of India Patent Office, First Examination Report, dated Mar. 21, 2014 for India Patent Application No. 3740/KOLNP/2006.
US Patent and Trademark Office, Non-Final Office Action, dated Mar. 27, 2014 for U.S. Appl. No. 13/073,469.
US Patent and Trademark Office, Notice of Allowance, dated May 28, 2014 for U.S. Appl. No. 13/615,306.
US Patent and Trademark Office, Non-Final Office Action, dated May 15, 2014 for U.S. Appl. No. 13/194,783.
USPTO, Final Office Action, mailed Sep. 4, 2014 for U.S. Appl. No. 12/827,964.
USPTO, Non-Final Office Action, mailed Sep. 5, 2014 for U.S. Appl. No. 14/144,225.
USPTO, Final Office Action mailed Jun. 18, 2014 for U.S. Appl. No. 13/609,033.
Office of the Controller-General of Patents, Designs and Trademarks, First Examination Report for Indian Patent Application No. 4190/KOLNP/2007 mailed Feb. 27, 2015.
USPTO Final Office Action issued in U.S. Appl. No. 12/347,465, dated Feb. 2, 2016.
USPTO, Notice of Allowance and Fee(s) Due in U.S. Appl. No. 14/558,490 mailed Sep. 9, 2015.
State Intellectual Property Office of the People's Republic of China, Office Action in Chinese Patent Application No. 200780030811.4 mailed Oct. 27, 2015.
USPTO, Office Action in U.S. Appl. No. 13/730,425 mailed Sep. 21, 2015.
USPTO, Office Action in U.S. Appl. No. 14/798,227 mailed Sep. 21, 2015.
USPTO, Office Action in U.S. Appl. No. 14/809,012 mailed Sep. 21, 2015.
USPTO, Notice of Allowance and Fee(s) Due in U.S. Appl. No. 14/468,059 mailed Sep. 29, 2015.
U.S. Appl. No. 14/809,012, filed Jul. 24, 2015.
State Intellectual Property Office of the People's Republic of China, Office Action in Chinese Patent Application No. 201210572890.4 mailed Feb. 9, 2015.
European Patent Office, Communication under Rule 71(3) EPC in Application No. 06 734 554.6-1908 mailed Feb. 13, 2015.
USPTO, Office Action in U.S. Appl. No. 14/449,896 mailed Feb. 18, 2015.
European Patent Office, Communication pursuant to Article 94(3) EPC in Application No. 05 758 509.3-1905 mailed Mar. 3, 2015.
USPTO, Office Action in U.S. Appl. No. 14/468,059 mailed Apr. 7, 2015.
USPTO, Notice of Allowance and Fee(s) Due in U.S. Appl. No. 14/144,225 mailed Apr. 8, 2015.
Japan Patent Office, Notice of Grounds for Rejection in Japanese Patent Application No. 2014-166162 mailed Apr. 28, 2015.
USPTO, Notice of Allowance and Fee(s) Due in U.S. Appl. No. 12/827,964 mailed Apr. 29, 2015.
USPTO, Office Action in U.S. Appl. No. 13/609,033 mailed May 7, 2015.
State Intellectual Property Office of the People's Republic of China, Office Action and Search Report in Chinese Patent Application No. 201210572890.4 mailed Jul. 7, 2015.
State Intellectual Property Office of the People's Republic of China, Notification of Reexamination in Chinese Patent Application No. 200810161874.X mailed Apr. 7, 2015.
U.S. Appl. No. 14/449,896, filed Aug. 1, 2014.
U.S. Appl. No. 14/468,059, filed Aug. 25, 2014.
USPTO, Final Office Action in U.S. Appl. No. 13/609,033 mailed Nov. 18, 2015.
USPTO Final Office Action, U.S. Appl. No. 13/194,783, Issued Mar. 10, 2016.
EPO Office Action, EP Patent Application No. 07814265.0, Issued Apr. 29, 2016.
USPTO Notice of Allowance, U.S. Appl. No. 13/609,033, Issued Jun. 17, 2016.
USPTO Non-Final Office Action, U.S. Appl. No. 13/730,425, Issued May 13, 2016.
USPTO Notice of Allowance, U.S. Appl. No. 14/798,227, Issued Apr. 27, 2016.

\* cited by examiner

APPARATUS AND METHOD FOR EFFECTIVELY IMPLEMENTING A WIRELESS TELEVISION SYSTEM

CROSS-REFERENCE TO RELATED APPLICATIONS

This application is a continuation of, and claims priority in, U.S. patent application Ser. No. 12/758,196 that was filed on Apr. 12, 2010 and is now U.S. Pat. No. 7,992,176. That application is a division of, and claims priority in, the application that issued as U.S. Pat. No. 7,725,912 on May 25, 2010. U.S. Pat. No. 7,725,912 is a continuation of, and claims priority in, U.S. patent application Ser. No. 09/318,904 entitled "Method for Effectively Implementing A Wireless Television System" that was filed on May 26, 1999. The foregoing related applications are commonly assigned, and are hereby incorporated by reference.

BACKGROUND OF THE INVENTION

Field of the Invention

The present invention relates generally to enhanced television systems, and relates more particularly to an apparatus and method for effectively implementing a wireless television system.

Description of the Background Art

Developing an effective method for implementing enhanced television systems is a significant consideration for contemporary television designers and manufacturers. In conventional television systems, a display device may be utilized to view program information received from a program source. The conventional display device is typically positioned in a stationary location because of restrictions imposed by various physical connections that electrically couple the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

However, portable television systems typically possess certain detrimental operational characteristics that diminish their effectiveness for use in modern television systems. For example, in order to eliminate restrictive physical connections, portable televisions typically receive television signals that are propagated from a remote terrestrial television transmitter to an antenna that is integral with the portable television. Because of the size and positioning constraints associated with a portable antenna, such portable televisions typically exhibit relatively poor reception characteristics, and the subsequent display of the transmitted television signals is therefore often of inadequate quality.

Other factors and considerations are also relevant to effectively implementing an enhanced wireless television system. For example, the evolution of digital data network technology and wireless digital broadcasting techniques may provide additional flexibility and increased quality to portable television systems. However, current wireless data networks typically are not optimized for flexible transmission and reception of video information.

Furthermore, a significant proliferation in the number of potential program sources (both analog and digital) may benefit a system user by providing an abundance of program material for selective viewing. In particular, an economical wireless television system for flexible home use may enable television viewers to significantly improve their television-viewing experience by facilitating portability while simultaneously providing an increased number of program source selections.

However, because of the substantially increased system complexity, such an enhanced wireless television system may require additional resources for effectively managing the control and interaction of various system components and functionalities. Therefore, for all the foregoing reasons, developing an effective method for implementing enhanced television systems remains a significant consideration for designers and manufacturers of contemporary television systems.

SUMMARY OF THE INVENTION

In accordance with the present invention, an apparatus and method are disclosed for effectively implementing a wireless television system. In one embodiment of the present invention, initially, one or more program sources are provided to a wireless base station that preferably differentiates the various types of program sources depending on whether the program source includes any combination of digital A/V data, analog video, or analog audio information.

If the program source includes digital A/V data, then, the wireless base station preferably formats the digital A/V data into an appropriate format, and provides the formatted data to a subsystem processor in the wireless base station. The subsystem processor responsively processes the formatted data to generate processed data (for example, by transcoding).

Similarly, if the program source includes analog video, then, the wireless base station preferably formats the analog video into an appropriate format, and provides the formatted video to the subsystem processor. The subsystem processor then responsively processes the formatted video to generate processed video.

In addition, if the program source includes analog audio, then, the wireless base station preferably formats the analog audio into an appropriate format, and provides the formatted audio to the subsystem processor. The subsystem processor then responsively processes the formatted audio to generate processed audio.

Next, the subsystem processor preferably combines the processed audio, video, and data into a processed stream. A communications processor then receives the processed stream, and responsively performs a wireless network processing procedure to generate a transmitter-ready stream. The communications processor may also advantageously receive and process various types of information from a wide-area network (such as the Internet).

Finally, a transmitter device receives and modulates the transmitter-ready stream, and advantageously performs a wireless network transmission process to propagate a broadcast stream to a remote TV, a remote controller, an auxiliary base station, or any other compatible display receiver device, in accordance with the present invention.

In certain embodiments, the foregoing communications processor may also provide information from various sources to a local-area network for transmission to the remote TV from an auxiliary base station that may preferably be coupled to the local-area network. For example, the communications processor may advantageously receive information from a wide-area network through a wide-area network interface, and responsively provide the information from the wide-area network to the foregoing local-area network through a local-area network interface.

The remote TV (or any other compatible display receiver device) preferably receives the broadcast stream from the wireless base station. A RF subsystem in the remote TV then preferably performs a wireless network processing procedure to generate a baseband stream. The foregoing wireless network processing procedure may include various appropriate techniques, such as demodulation and down-conversion of the broadcast stream propagated from the wireless base station.

An A/V decoder then preferably receives and demultiplexes the baseband stream into separate components which may include separate data, video, and audio information. If the baseband stream includes data information, then, the A/V decoder preferably manipulates the data information into an appropriate format to thereby generate manipulated data. Similarly, if the baseband stream includes video information, then the A/V decoder preferably decompresses the video information to generate decompressed video. In addition, if the baseband stream includes audio information, then the A/V decoder preferably decompresses the audio information to generate decompressed audio. The A/V decoder may then preferably provide the decompressed audio to an amplifier and speakers which operate to aurally reproduce the decompressed audio.

Concurrently, a display controller preferably may access the manipulated data and the decompressed video, and responsively perform a graphical user interface (GUI) processing procedure to generate display data and display video for presentation on the remote TV. Finally, the display controller provides the display data and the display video to the remote TV for remote viewing by a user of the wireless television system.

Therefore, the present invention effectively implements a flexible wireless television system that utilizes various heterogeneous components to facilitate optimal system interoperability and functionality. The present invention thus effectively and efficiently implements an enhanced wireless television system.

DETAILED DESCRIPTION OF THE PREFERRED EMBODIMENT

The present invention relates to an improvement in television systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention may comprise an apparatus and method for effectively implementing a wireless television system, and may preferably include a communications processor and a transmitter device that may combine at least one of a local-area network interface, a wide-area network interface, and one or more television data interfaces for effectively performing a wireless network transmission process. A transmitted stream from the wireless television system may preferably be received via wireless network processing for viewing local-area network data, wide-area network data (such as Internet data), or television data by flexibly utilizing various electronic devices such as a notepad personal computer, a personal digital assistant (PDA), or a handheld TV remote control device.

Figure 1:
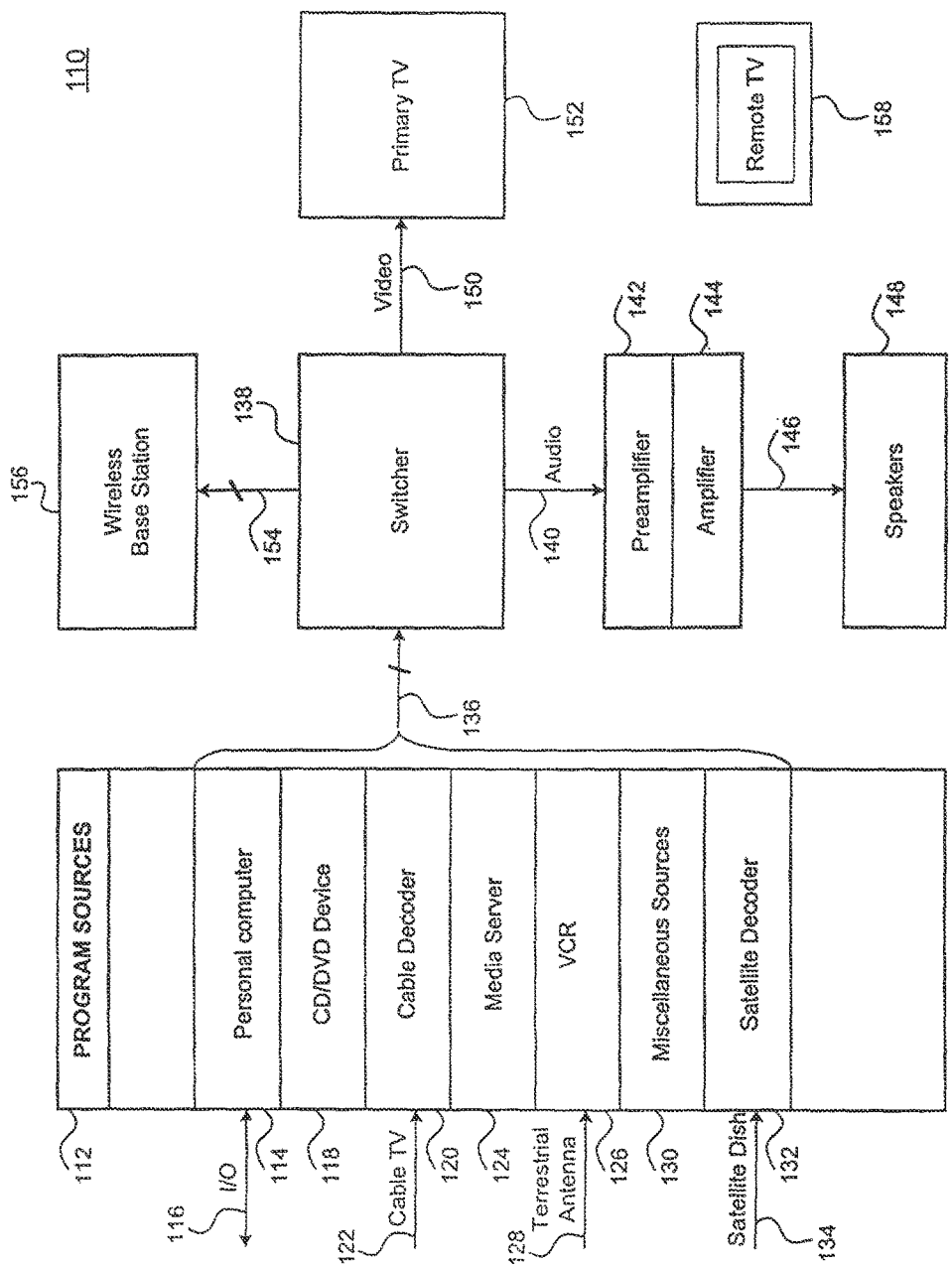
FIG. 1 is a block diagram of a basic wireless television system, in accordance with one embodiment of the present invention.

Referring now to FIG. 1, a block diagram of a basic wireless television system 110 is shown, in accordance with one embodiment of the present invention. In the FIG. 1 embodiment, wireless television system 110 preferably includes, but is not limited to, a number of programs sources 112, a switcher 138, a wireless base station 156, a primary television (TV) 152, a remote television (TV) 158, a preamplifier 142, an amplifier 144, and speakers 148. In other embodiments of the present invention, wireless television system 110 may readily include other components that are different from, or in addition to, those described in conjunction with the FIG. 1 embodiment.

In the FIG. 1 embodiment, wireless television system 110 is preferably configured for economical and efficient use in a home environment, however, in alternate embodiments, the present invention may be implemented for use in any appropriate environment. In the FIG. 1 embodiment, program sources 112 preferably comprise a selectable variety of consumer electronics devices that may include, but are not limited to, a personal computer 114 that communicates with other devices through input/output (I/O) path 116, a compact disk/digital video disk device (CD/DVD device) 118, a cable decoder 120 that receives a cable TV signal on path 122, a media server 124 that stores and provides various types of selectable programming, a video cassette recorder (VCR) 126 that receives a terrestrial antenna signal on path 128, miscellaneous sources 130 that may include any desired type of program sources, and a satellite decoder 132 that receives a satellite dish signal on path 134.

In alternate embodiments of the present invention, program sources 112 may readily be configured to include any other types of program sources or devices that are different from, or in addition to, those described in conjunction with the FIG. 1 embodiment. For example, program sources 112 may provide any type of information, including video, audio, or data sources, that may be formatted in any compatible or appropriate format. Furthermore, program sources 112 may readily be implemented to include information for use in environments other than economical consumer home applications. For example, wireless television system 110 may readily be configured to include program sources 112 that are intended for various other uses, including industrial, governmental, or scientific applications.

The present invention also supports various types of supplemental data transmissions that may be implemented as a separate program source 112, or may alternately be incorporated into another program source 112. For example, relevant program guide information and/or video channel guide information may be provided as a program source 112, or may be incorporated into another program source 112. Such program guide information may be provided in any suitable manner, including from a television broadcast vertical-blanking interval (VBI) signal, from MPEG system data, or from the Internet through a wide-area network (WAN) connection.

In the FIG. 1 embodiment, switcher 138 preferably receives individual program signals from each of the program sources 112 via path 136. Switcher 138 then preferably selects one or more of the program sources 112 as a switcher output program in response to control information typically provided by a viewer of system 110. Switcher 138 preferably provides video information from the switcher output program to primary TV 152 via path 150. Similarly, switcher 138 preferably provides audio information from the switcher output program to amplifier 144 through preamplifier 142 via path 140. Amplifier 144 then provides the amplified audio information to speakers 148 via path 146.

In accordance with the present invention, switcher 138 preferably also provides one or more program sources 112 to wireless base station 156 through path 154. In the FIG. 1 embodiment, wireless base station 156 is implemented as a discrete component in system 110. However, in alternate embodiments, wireless base station 156 may readily be implemented as part of a set-top box (not shown) or any other component in system 110. In addition, wireless base station 156 may readily receive program sources 112 using one or more different routings than that discussed in conjunction with the FIG. 1 embodiment. For example, wireless base station 156 may be implemented as part of primary TV 152 and then receive program sources 112 from a picture-in-picture (PIP) tuner corresponding to primary TV 152.

In accordance with the present invention, wireless base station 156 then advantageously processes the received program source(s) 112, and wirelessly transmits the processed program source(s) 112 as a broadcast stream to remote TV 158 for flexible remote viewing by a system user. The implementation and functionality of wireless base station 156 and remote TV 158 are further discussed below in conjunction with FIGS. 2 through 9.

Figure 2:
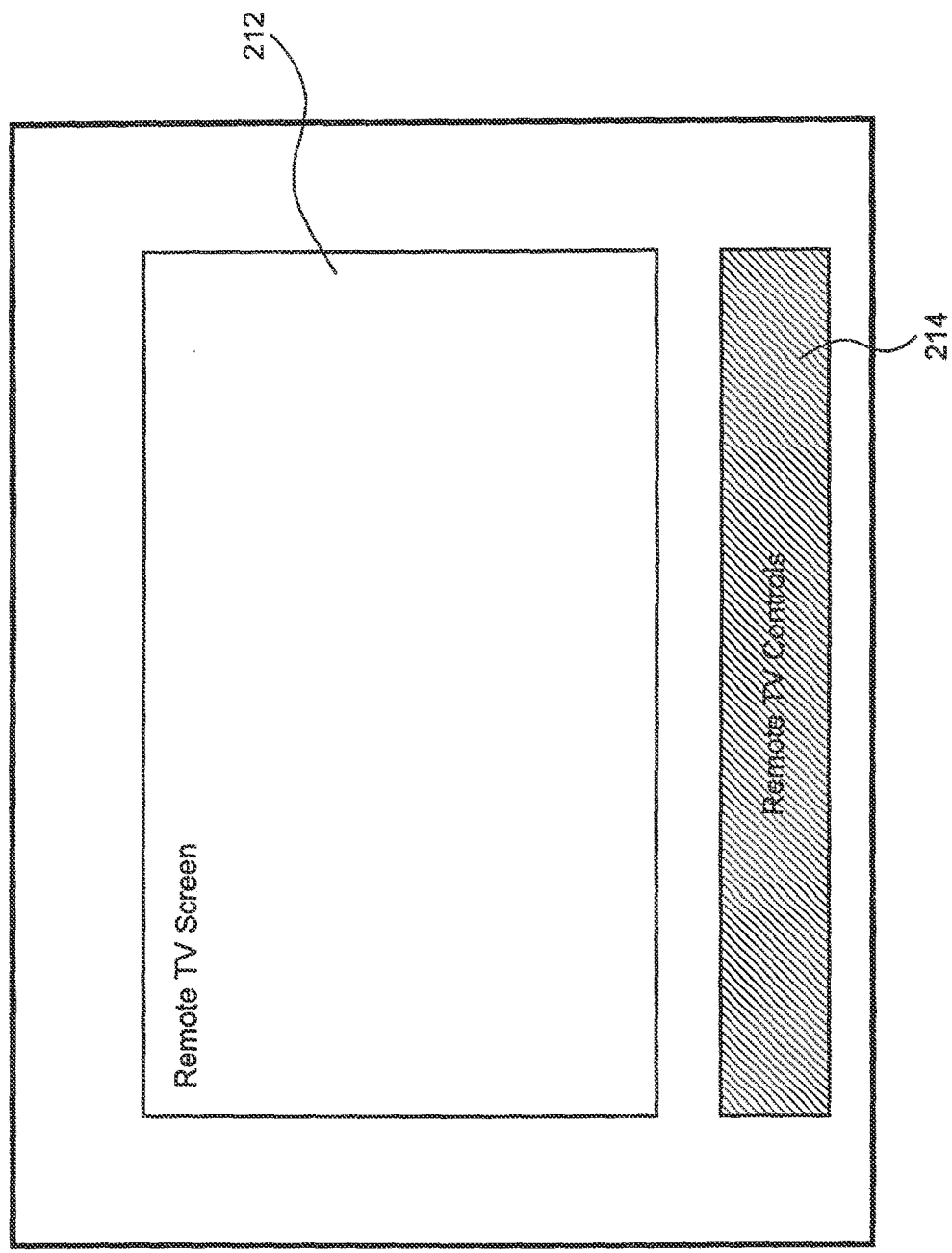
FIG. 2 is a drawing of the remote television of FIG. 1, in accordance with one embodiment of the present invention.

Referring now to FIG. 2, a drawing of the FIG. 1 remote TV 158 is shown, in accordance with one embodiment of the present invention. In the FIG. 2 embodiment, remote TV 158 preferably includes, but is not limited to, a remote TV screen 212 and remote TV controls 214. Remote TV 158 is preferably implemented as a light-weight portable display device that receives a broadcast stream from wireless base station 156, and responsively displays at least one selectable program source 112 on remote TV screen 212. In alternate embodiments, remote TV 158 may be implemented as a personal digital assistant (PDA) device, a notepad personal computer or any other desired display device.

In the FIG. 2 embodiment, remote TV controls 214 may include conventional controls and programmable controls that may be used by a viewer to control certain operating parameters of wireless television system 110. For example, remote TV controls 214 may be used either to control the operation of remote TV 158, or to control the operation of other components and subsystems in system 110 through a wireless transmission (for example, selecting a program source 112 through switcher 138). Remote TV screen 212 preferably includes color or monochrome display components that may be implemented using any appropriate and compatible display technology. In addition, remote TV screen 212 may employ touch-screen technology to control various display operating parameters as well as other technologies such as handwriting or voice input recognition.

In alternate embodiments, remote TV 158 may readily be implemented in any other desired manner. For example, remote TV 158 may be implemented as a wireless non-portable television in order to perform various types of special viewing applications that may require a wireless display. The operation and functionality of remote TV 158 are further discussed below in conjunction with FIG. 7.

Figure 3:
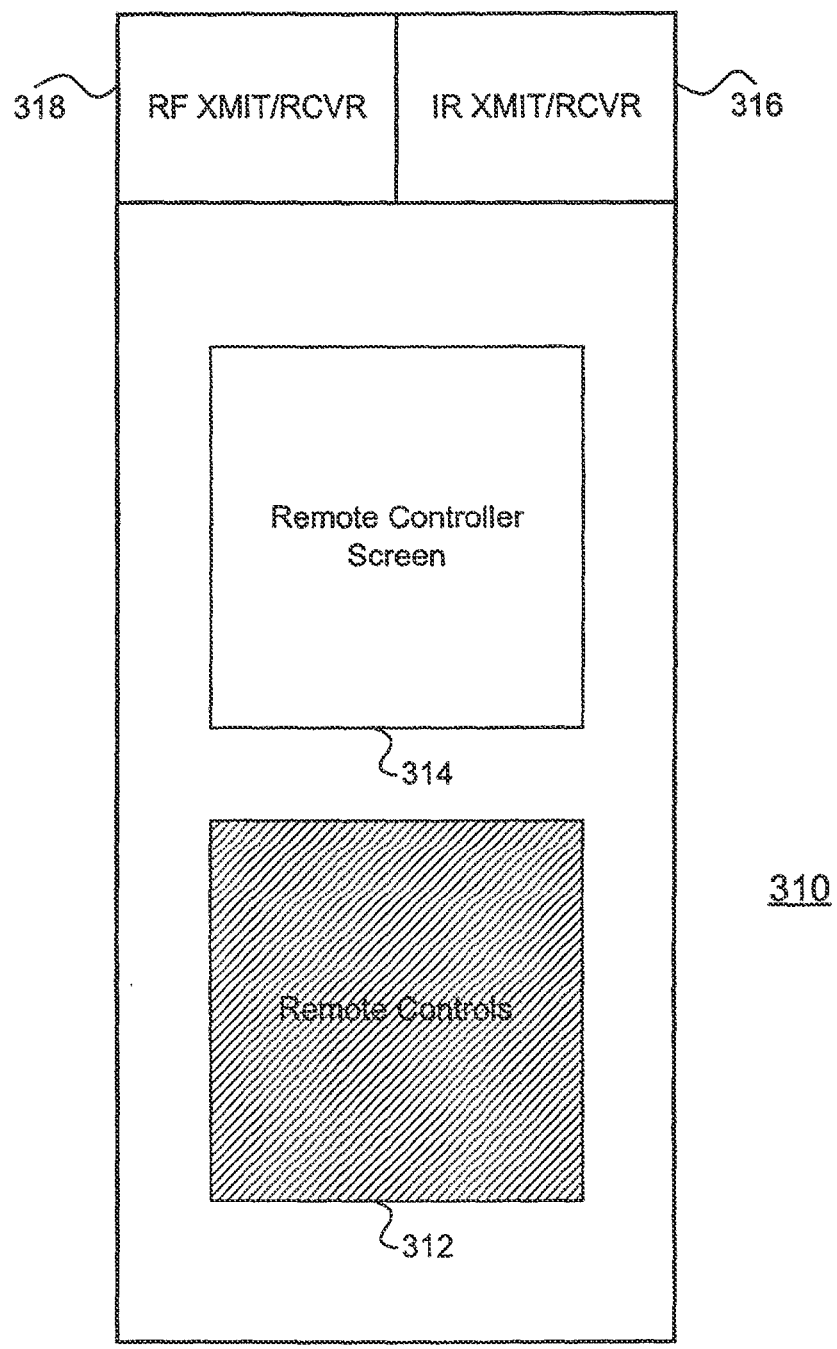
FIG. 3 is a drawing of a remote controller for use with the wireless television system of FIG. 1, in accordance with one embodiment of the present invention.

Referring now to FIG. 3, a drawing of a remote controller 310 for use with the FIG. 1 wireless television system 110 is shown, in accordance with one embodiment of the present invention. In the FIG. 3 embodiment, remote controller 310 is a hand-held device that preferably includes, but is not limited to, a remote controller screen 314, remote controls 312, a radio-frequency transmitter/receiver (RF XMIT/RCVR) 318 and an infrared transmitter/receiver (IR XMIT/RCVR) 316.

In the FIG. 3 embodiment, remote controls 312 may be used by a viewer to control various components and operating parameters of wireless television system 110. For example, remote controls 312 may be used to control the operation of other components and subsystems in system 110 through a wireless transmission process using either RF XMIT/RCVR 318 or IR XMIT/RCVR 316.

Remote controller screen 314 preferably includes display components that may be implemented using any appropriate and compatible display technology. Remote controller 310 may thus advantageously receive a broadcast stream from wireless base station 156 through either RF XMIT/RCVR 318 or IR XMIT/RCVR 316, and responsively display at least one selectable program source 112 on remote controller screen 314.

In one embodiment, remote controller screen 314 may thereby allow system users to preview various different selectable program sources 112 while simultaneously viewing an uninterrupted primary program source 112 on primary TV 152 or on remote TV 158. In the foregoing preview function, remote controller screen may receive a wireless transmission originating from a separate picture-in-picture (PIP) tuner in wireless television system 110. The preview function may therefore be utilized for functions like programming VCR 126 or previewing other channels without interrupting other concurrent program viewing activities. The operation and functionality of remote controller 310 are further discussed below in conjunction with FIG. 7.

Figure 4:
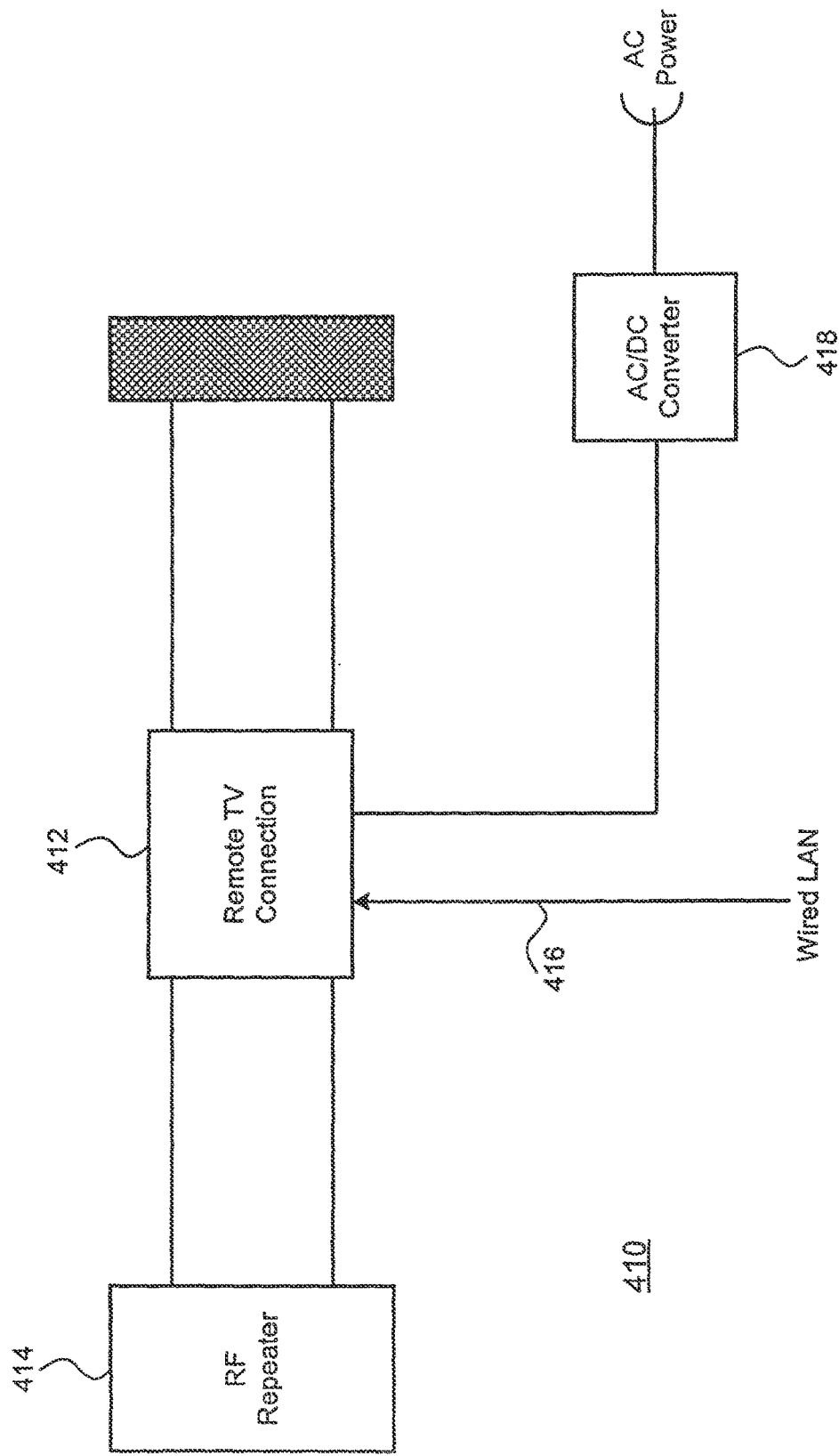
FIG. 4 is a drawing of an auxiliary base station for use with the wireless television system of FIG. 1, in accordance with one embodiment of present invention.

Referring now to FIG. 4, a drawing of an auxiliary base station 410 for use with the FIG. 1 wireless television system 110 is shown, in accordance with one embodiment of present invention. In the FIG. 4 embodiment, auxiliary base station 410 includes, but is not limited to, a radio-frequency (RF) repeater 414, a remote TV connection 412, and an alternating current/direct current (AC/DC) converter 418. In alternate embodiments, auxiliary base station 410 may readily be implemented to include various other components that are different from, or in addition to, those discussed in conjunction with the FIG. 4 embodiment.

In the FIG. 4 embodiment, RF repeater 414 preferably provides an enhanced transmission of one or more program sources 112 to remote TV 158 or remote controller 310 to thereby advantageously improve transmission quality in situations where remote TV 158 or remote controller 310 cannot receive adequate wireless transmissions directly from wireless base station 156. For example, various factors such as wall density and composition, or physical distances from wireless base station 156 may significantly deteriorate transmission strength and quality.

In accordance with the present invention, RF repeater 414 may then receive and enhance a broadcast stream that is transmitted directly from wireless base station 156 using radio-frequency transmission techniques. Alternately, RF repeater 414 may receive and enhance program source transmissions and transport various types of control information provided over a hard-wired home network (wired local-area network (LAN) 416) that may be implemented using any suitable techniques and configurations.

In certain embodiments, wireless television system 110 may include multiple auxiliary base stations 410 that each operate on a different transmission subchannel. In accordance with the present invention, remote TV 158 or remote controller 310 may therefore advantageously search to locate a particular subchannel that provides the highest quality transmission signal, and then transparently switch to the corresponding auxiliary base station 410 for optimal wireless transmission.

In the FIG. 4 embodiment, a system user may store remote TV 158 on auxiliary base station 410 by connecting remote TV 158 to remote TV connection 412. Further more, AC/DC converter 418 may provide operating power to RF repeater 414, and may also recharge batteries in remote TV 158 through remote TV connection 412.

Figure 5:
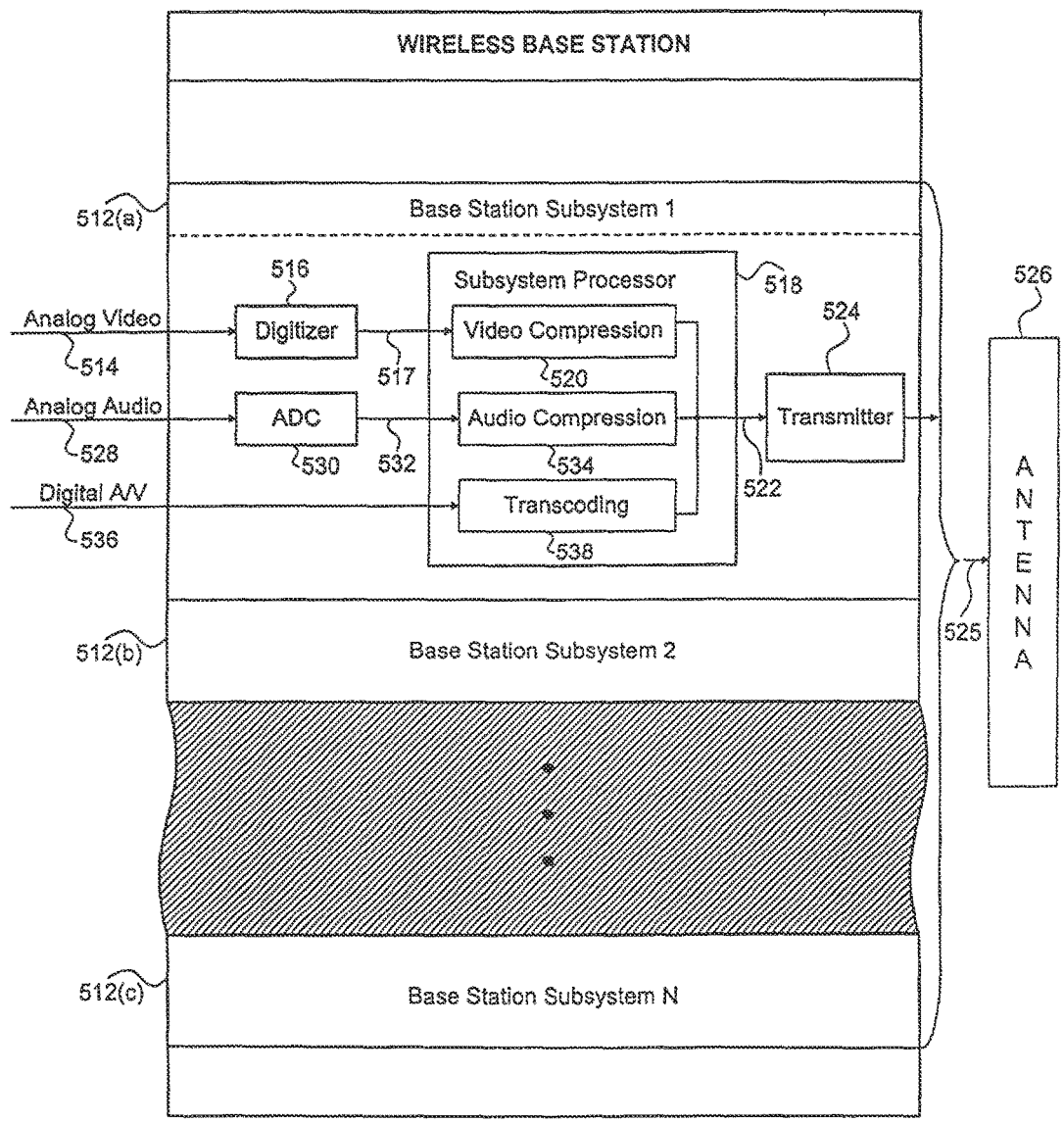
FIG. 5 is a block diagram of the wireless base station of FIG. 1, in accordance with one embodiment of present invention.

Referring now to FIG. 5, a block diagram of the FIG. 1 wireless base station 156 is shown, in accordance with one embodiment of present invention. In the FIG. 5 embodiment, base station 156 preferably includes, but is not limited to, a base station subsystem 1 (512(*a*)) through a base station subsystem N (512(*c*)), and an antenna 526.

In the FIG. 5 embodiment, wireless base station 156 preferably may utilize various advanced radio-frequency transmission techniques, such as spread-spectrum broadcasting via code division multiple access (CDMA). Therefore, each base station subsystem (512(*a*) through 512(*c*)) may be efficiently implemented using a same or similar configuration, and may each correspond to a separate radio-frequency transmission sub-channel. However, for purposes of clarity in FIG. 5, only base subsystem 1 (512(*a*)) includes a block diagram of selected modules that are typically present in each base station subsystem 516(*a* through *c*) of wireless base station 156. In alternate embodiments, wireless base station 156 may readily be implemented to include various configurations, components, and subsystems other than those discussed in conjunction with the FIG. 5 embodiment.

In the FIG. 5 embodiment, base station subsystem 512(*a*) preferably receives various input signals that may include analog video on path 514, analog audio on path 528, and digital audio/video (A/V) data on path 536. In alternate embodiments, base station subsystem 512(*a*) may readily receive any other types of appropriate and compatible input signals.

In accordance with the present invention, subsystem processor 518 preferably receives various information from program sources 112 that may be encoded using an extensive variety of formats and configurations. Subsystem processor 518 then preferably processes and manipulates the received program sources 112 to advantageously generate processed program information in a particular format that is compatible for downstream use by transmitter 324 and remote TV 158. For example, in an economical home-use installation, subsystem processor 518 may receive a high-frequency digital video bitstream, and responsively down-convert the video bitstream to a bit rate that is more appropriate for economical transmission techniques. Subsystem processor 518 may also perform various other functions, including image bit allocation based on a particular configuration of remote TV 158, programmable image resolution with filtered image-size scaling, and identifier-key detection for enabling access to premium programming.

In the case of analog video information, digitizer 516 converts the analog video on path 514 into digital video that subsystem processor 518 then receives via path 517. Subsystem processor 518 responsively performs various signal processing procedures on the received digital video, preferably including video compression 520. In one embodiment of the present invention, video compression 520 preferably includes various MPEG-2 techniques and processes. Following the foregoing video signal processing procedures, subsystem processor 518 preferably provides the processed video to transmitter 524 via path 522.

Processing of video may also include various forms of frame rate conversion in order to reduce the bit rate provided to transmitter 524. In a simple example of reducing the frame rate, a 60 field NTSC input video may be dropped down to 30 fields per second by dropping every other field. A more complex technique for reducing the frame rate may include de-interlacing the fields into frames either through processing the fields or by detection of film content and through the technique of "3:2 pull down" converting the fields back to the original 24 frames per second of the movie content. Most LCD displays are non-interlaced and de-interlacing prior to transmission may result in a more efficient system.

In the case of analog audio information, analog-to-digital converter (ADC) 530 converts analog audio on path 528 into digital audio that subsystem processor 518 then receives via path 532. Subsystem processor 518 responsively performs various signal processing procedures on the received digital audio, preferably including audio compression 534. In one embodiment of the present invention, audio compression 534 preferably includes various MPEG-2 techniques and processes. Following the foregoing audio signal processing procedures, subsystem processor 518 preferably provides the processed audio to transmitter 524 via path 522.

In the case of digital audio/video data received on path 536, subsystem processor 518 performs various signal processing procedures on the received digital audio/video bitstream, preferably including transcoding 538. In one embodiment of the present invention, transcoding 538 preferably converts the digital A/V data received on path 536 into processed data that includes a different and more appropriate bit rate, as discussed above. Digital A/V bus may follow a standard such as the IEEE 1394. Alternatively, the video may be in an analog format while the audio follows a digital standard such as S/PDIF (Sony/Philips Digital Interface) where the audio can either be in a compressed or non-compressed digital format. Compressed audio may include multi-channel audio such as rear channels or a subwoofer channel. In the case of multi-channel audio, the signal processing of 518 may perform processing to reduce the number of audio channels either through dropping of audio channels or through processing to produce the effect of multiple audio channels coded into a reduced number of audio channels. Following the foregoing signal processing procedures, subsystem processor 518 provides the processed data to transmitter 524 via path 522.

Therefore, subsystem processor 518 may advantageously receive one or more program sources 112 that are formatted in any appropriate manner, and responsively generate a processed stream that is formatted in any appropriate manner. For example, subsystem processor 518 may receive MPEG-2 variable bit rate video programming and responsively generate a constant bit rate stream that may be formatted as an MPEG-2 elementary, packetized elementary, program or transport stream. Similarly, subsystem processor 518 may receive high-definition television (HDTV) video programming and responsively generate a standard definition television stream.

In the FIG. 5 embodiment, transmitter 524 may be implemented to include any desired types of effective transmission techniques, including spread spectrum methods via code division multiple access (CDMA) that may utilize frequency-hopping or direct sequencing techniques. Transmitter 524 preferably receives the processed and combined video, audio, and data from subsystem processor 518 as a transport stream, and responsively transmits a broadcast stream to remote TV 158 or remote controller 310 via path 525 and antenna 526. More detailed operation and functionality for one embodiment of a base station subsystem 512 are further discussed below in conjunction with FIG. 6.

Figure 6:
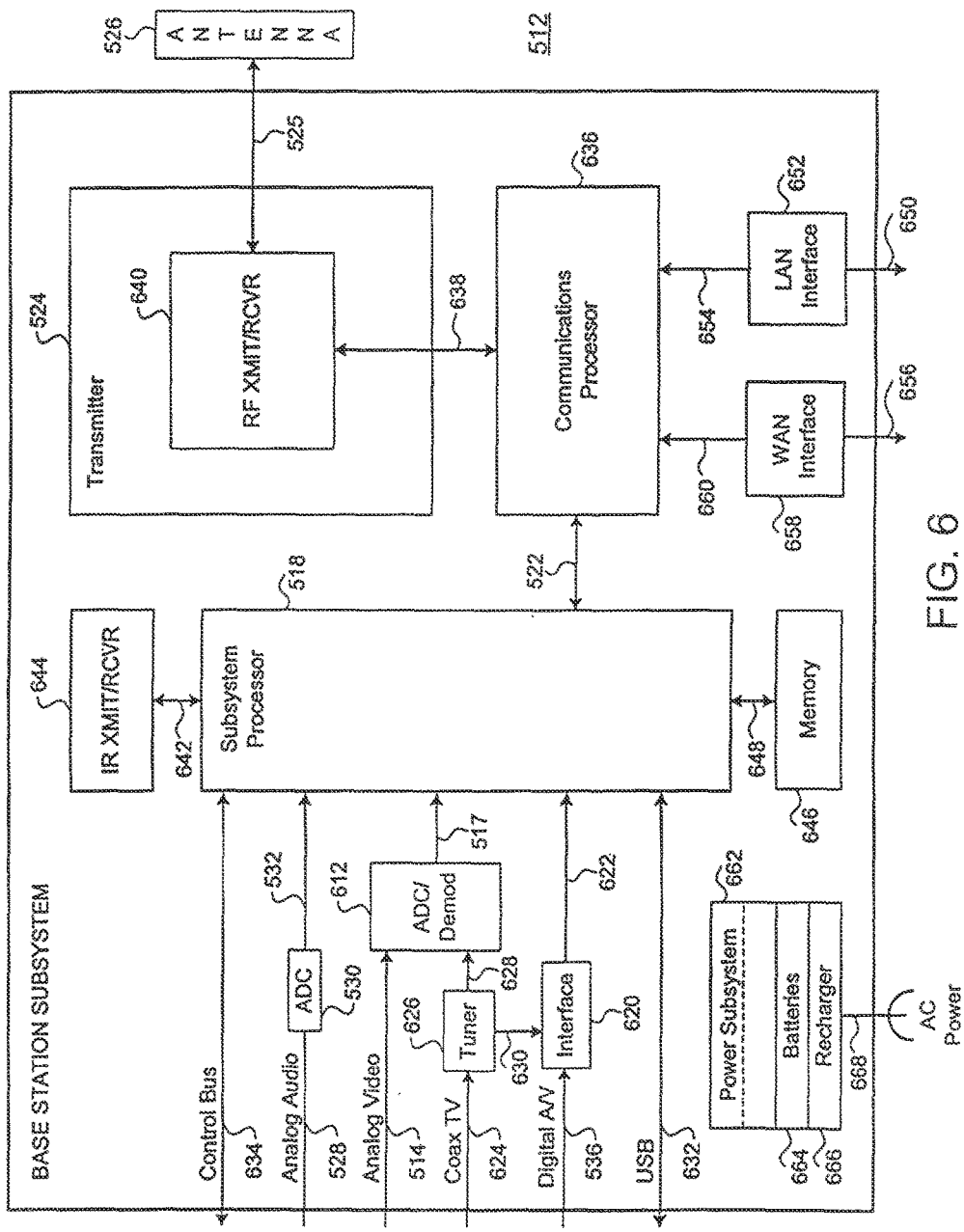
FIG. 6 is a block diagram of an exemplary base station subsystem, in accordance with one embodiment of present invention.

Referring now to FIG. 6, a block diagram of an exemplary base station subsystem 512 is shown, in accordance with one embodiment of the present invention. In the FIG. 6 embodiment, base station subsystem 512 preferably includes, but is not limited to, a subsystem processor 518, an infrared transmitter/receiver (IR XMIT/RCVR) 644, a memory 646, a wide-area network (WAN) interface 658, a local-area network (LAN) interface 652, a communications processor 636, a transmitter 524, an antenna 526, and a power subsystem 662. In alternate embodiments, base station subsystem 512 may readily be implemented to include various components that are different from, or in addition to, those discussed in conjunction with the FIG. 6 embodiment.

In the FIG. 6 embodiment, subsystem processor 518 preferably may receive various selectable program signals from any appropriate source, including program sources 112 (FIG. 1). Subsystem processor 518 then responsively processes and manipulates the received program signals to generate a processed output stream on path 522, as discussed above in conjunction with FIG. 5. Subsystem processor 518 preferably also communicates with memory 646 via path 648. Memory 646 may be configured using any desired format, and may be utilized to store any information required by wireless television system 110, including various processing software instructions for subsystem processor 518.

In the FIG. 6 embodiment, subsystem processor 518 may receive analog audio via path 528, analog-to-digital converter 530, and path 532. Subsystem processor 518 may also receive analog video via path 514, analog-to-digital converter/demodulator (ADC/Demod) 612, and path 517. Similarly, subsystem processor 518 may receive digital audio/video (A/V) data via path 536, bus interface 620, and path 622.

In addition, a tuner 626 may receive a coaxial television signal (Coax TV) on path 536 and responsively provide a selectable television source to subsystem processor 518 through either path 630 (for digital TV signals), or through path 628 (for analog TV signals). Subsystem processor 518 may also utilize universal serial bus (USB) 632 to communicate directly with various devices such as personal computer 114 (FIG. 1).

In accordance with the present invention, subsystem processor 518 may also advantageously communicate with compatible components throughout wireless television system 110 using a control bus 634. In the FIG. 6 embodiment, control bus 634 may be implemented using any compatible configuration and/or protocol. For example, control bus 634 may be effectively implemented in accordance with a control bus standard, and may also utilize various signaling protocols and techniques in compliance with a Home Audio-Video Home Interoperability (HAVI) standard.

In the FIG. 6 embodiment, subsystem processor 518 preferably combines processed video, processed audio, and processed data to thereby provide a processed stream comprising one or more selectable processed program sources 112 to communications processor 636 through path 522. In response, communications processor 636 performs a network processing procedure on the processed stream to generate a transmitter-ready stream to radio-frequency transmitter/receiver (RF XMIT/RCVR) 640 via path 638. Communications processor 636 preferably performs the foregoing network processing procedure in response to relevant characteristics of wireless television system 110. For example, the network processing procedure may depend on various factors such as the particular wireless transmission techniques utilized for effective wireless transmission or the type of bus arbitration required for WAN or LAN interfaces.

In the FIG. 6 embodiment, RF XMIT/RCVR 640 may then manipulate (for example, up-convert and modulate) the transmitter-ready stream to advantageously generate and transmit a broadcast stream through path 525 and antenna 526 to remote TV 158, remote controller 310, or auxiliary base station 410, in accordance with the present invention. In the FIG. 6 embodiment, RF XMIT/RCVR 640 may be implemented to include any desired types of effective up-conversion, modulation, or other wireless transmission techniques, including spread spectrum methods via code division multiple access (CDMA) that may utilize appropriate frequency-hopping or direct sequencing techniques. In one embodiment of the present invention, subsystem processor 518 may also transmit the processed stream to remote TV 158, remote controller 310, or auxiliary base station 410 using IR XMIT/RCVR 644. Wireless base station 156 also preferably embodies one or more effective transmission protocols that include isochronous support for transmission of multimedia information.

In the FIG. 6 embodiment, base station subsystem 512 may communicate with various wide-area networks (such as the Internet) via WAN interface 656. For example, subsystem processor 518 may readily access digital A/V data from the Internet via path 656, WAN interface 658, path 660, communications processor 636, and path 522. Subsystem processor 518 may then process the Internet A/V data, and subsequently provide the processed Internet A/V data through path 522 to communications processor 636 for wireless transmission by RF XMIT/RCVR 640, as discussed above. In accordance with the present invention, communications processor 636 may also provide the transmitter-ready stream to RF repeater 414 in auxiliary base station 410 via path 654, LAN interface 652, and path 650, as discussed above in conjunction with FIG. 4. In some systems, for example a cable modem system, the WAN connection 656 may physically be the same as the Coax TV interface 624. In another system, such as a home network using the standard phone line, the WAN connection 656 may physically be the same as the LAN interface connection 650.

In the FIG. 6 embodiment, remote TV 158 or remote controller 310 may advantageously transmit wireless radio-frequency control information to subsystem processor 518 through antenna 526, RF XMIT/RCVR 640, and communications processor 636. In response, subsystem processor 518 may function as a master controller to utilize the received wireless radio-frequency control information for controlling various components and functionalities in wireless television system 110. Subsystem processor 518 may use the received RF control information in any suitable manner. For example, subsystem processor 518 may control appropriate system components either by hard-wired connections, by utilizing control bus 634, or by transmitting the control information through path 642 and infrared transmitter/receiver (IR XMIT/RCVR) 644.

In accordance with the present invention, subsystem processor 518 may also utilize IR XMIT/RCVR 644 and RF XMIT/RCVR 640 to advantageously monitor all remotely-generated system control signals. Subsystem processor 518 may then responsively maintain corresponding system component status information in memory 646 to facilitate intelligent system control interaction in wireless television system 110. For example, a system user in a viewing location that is remote from program sources 112 may be unaware of the current status of a given program source, such as VCR 126. According to the present invention, subsystem processor 518 may therefore utilize the stored component status information to intelligently respond to a remote viewer request that is provided by wireless transmission from remote TV 158 or remote controller 310.

In the FIG. 6 embodiment, power subsystem 662 preferably provides operating power for base station subsystem 512. Power subsystem 662 preferably includes a recharger 666 for recharging remote TV 158 and remote controller 310. Power subsystem 622 also preferably includes batteries 664 which may serve as a backup power source so that, even when main operating power is turned off, base station subsystem 512 may still monitor system control information to components of wireless television system 110, and thereby maintain current system status information in memory 646.

Figure 7:
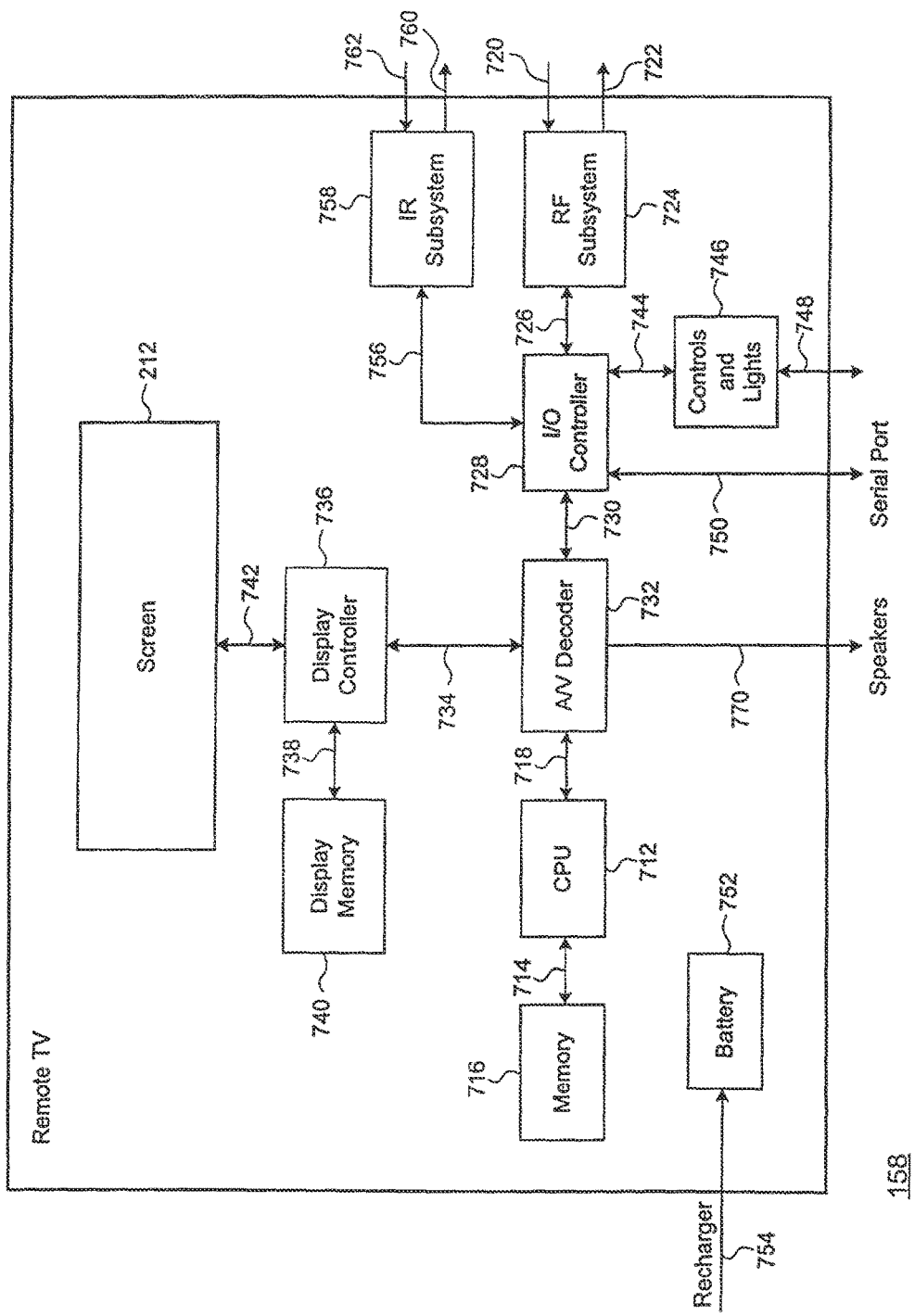
FIG. 7 is a block diagram of the remote television from FIG. 1, in accordance with one embodiment of present invention.

Referring now to FIG. 7, a block diagram of the FIG. 1 remote TV 158 is shown, in accordance with one embodiment of present invention. For reasons of clarity, the following discussion of the FIG. 7 embodiment is made in reference to remote TV 158. However, in accordance with the present invention, the FIG. 7 embodiment is equally descriptive of selected functional components from either remote TV 158 or remote controller 310. In alternate embodiments, remote TV 158 and remote controller 310 may readily be implemented using various techniques and designs other than those discussed in conjunction with the FIG. 7 embodiment.

In the FIG. 7 embodiment, remote TV 158 preferably receives a broadcast stream from RF XMIT/RCVR 640 of wireless base station 156 (or RF repeater 414 of auxiliary base station 410) through an integral portable antenna that couples the broadcast stream through path 720 to radio-frequency (RF) subsystem 724. Radio-frequency (RF) subsystem 724 responsively processes (for example, down-converts and demodulates) the broadcast stream to generate a baseband stream.

Input/output (I/O) controller 728 then preferably receives the baseband stream via path 726 and responsively provides the baseband stream via path 730 to audio/video (A/V) decoder 732. Under the control of central processing unit (CPU) 712, and in response to various software instructions stored in memory 716, A/V decoder then preferably demultiplexes and decodes the baseband stream to generate separate decoded video, audio, and data information.

Display controller 736 may then receive the decoded video and data via path 734, and temporarily store the decoded video and data into display memory 740 via path 738. At the appropriate time, display controller 736 may then retrieve the decoded video and data from display memory 740, and provide the decoded video and data via path 742 to remote TV screen 212 for display to a system user. Display controller 736 may also provide the decoded audio to an amplifier and speakers for aural reproduction via path 770.

In the FIG. 7 embodiment, infrared (IR) subsystem 758 may alternately receive a broadcast stream from IR XMIT/RCVR 644 of wireless base station 156 through path 762. IR subsystem 758 may then provide the broadcast stream to I/O controller 728 via path 756 for further downstream manipulation and display, as discussed above.

In accordance with the present invention, a system user may supply desired component control information to I/O controller 728 by using controls and lights 746 and path 744, or by using any other appropriate means. I/O controller may then wirelessly transmit the component control information to wireless base station 156 via path 726, RF subsystem 724, and path 722, or via path 756, IR subsystem 758, and path 760, as discussed above in conjunction with FIG. 6.

In the FIG. 7 embodiment, remote TV 158 preferably includes a battery 752 that supplies display operating power, and which may be recharged via path 754. Remote TV 158 may also comprise a serial port 750, such as a universal serial bus (USB), for connecting remote TV 158 to a host personal computer to thereby allow various interactive processes, including performing setup, data exchange, and backup procedures for remote TV 158. Alternatively, the host personal computer may use the RF, IR or LAN connections for setup, data exchange and backup procedures for remote TV 158.

Figure 8:
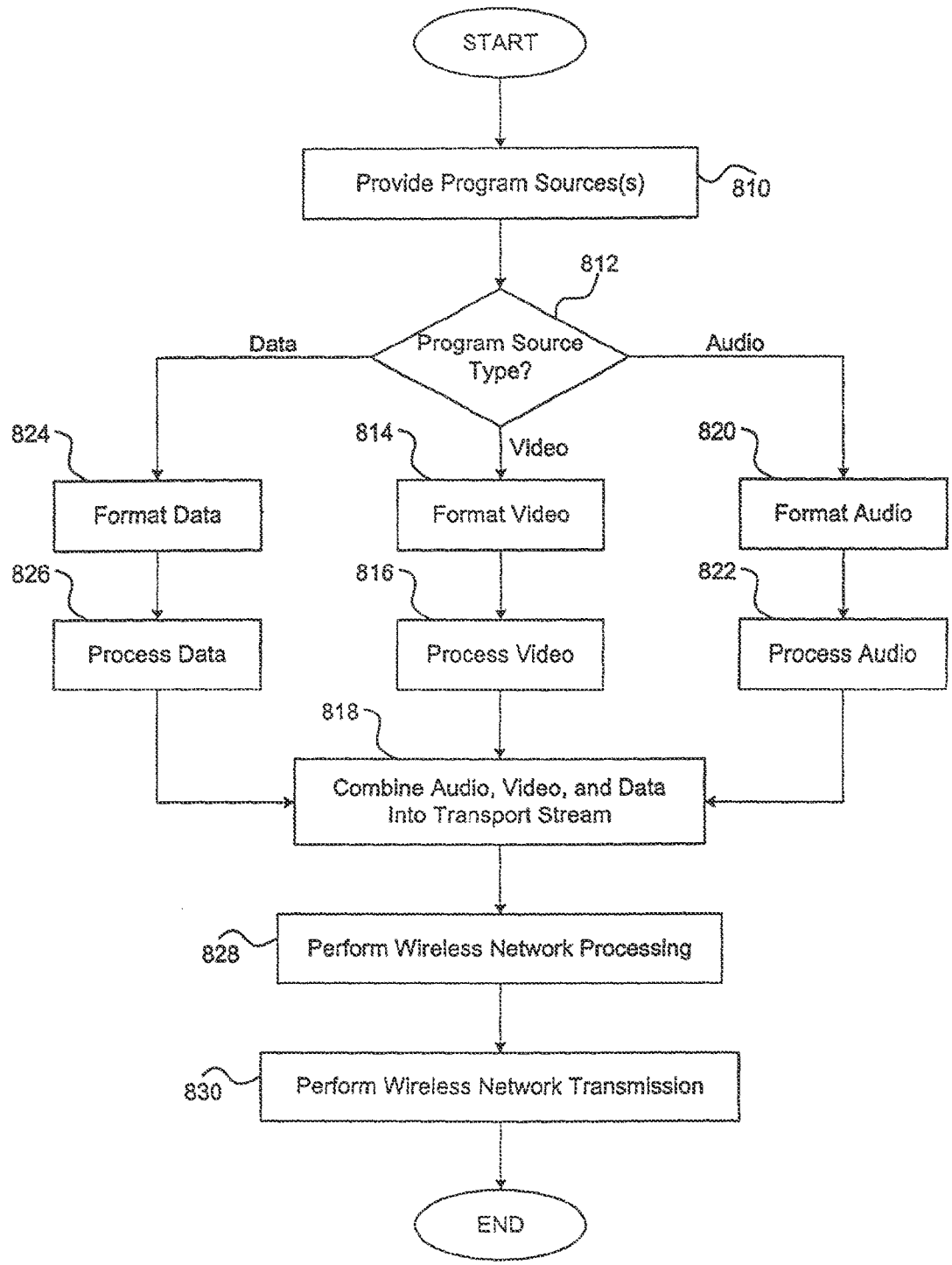
FIG. 8 is a flowchart of method steps for performing a wireless transmission procedure, in accordance with one embodiment of present invention.

Referring now to FIG. 8, a flowchart of method steps for performing a wireless transmission procedure is shown, in accordance with one embodiment of present invention. In the FIG. 8 embodiment, initially, in step 810, wireless television system 110 provides one or more program sources 112 to wireless base station 156. In step 812, wireless base station 156 differentiates various types of program sources 112 depending on whether the program source(s) 112 include any combination of digital A/V data, analog video, or analog audio information.

If program source 112 includes digital A/V data, then, in step 824, wireless base station 156 preferably formats the digital A/V data into an appropriate format, and provides the formatted data to subsystem processor 518 in wireless base station 156. In step 826, subsystem processor 518 responsively processes the formatted data to generate processed data (for example, by transcoding), and then the FIG. 8 process advances to step 818.

Similarly, if program source 112 includes analog video, then, in step 814, wireless base station 156 formats the analog video into an appropriate format, and provides the formatted video to subsystem processor 518 in wireless base station 156. For example, ADC/Demod 612 may convert the analog video into an appropriate digital format. Then, in step 816, subsystem processor 518 responsively processes the formatted video to generate processed video, and the FIG. 8 process advances to step 818.

In addition, if program source 112 includes analog audio, then, in step 820, wireless base station 156 formats the analog audio into an appropriate format, and provides the formatted audio to subsystem processor 518 in wireless base station 156. For example, ADC 530 may convert the analog video into an appropriate digital format. In step 822, subsystem processor 518 responsively processes the formatted audio to generate processed audio, and then the FIG. 8 process advances to step 818.

In step 818, subsystem processor 518 preferably combines the processed audio, video, and data into a processed stream. Then, in step 828, communications processor 636 receives the processed stream generated in foregoing step 818, and responsively performs a wireless network processing procedure to generate a transmitter-ready stream. Finally, in step 830, transmitter 524 receives and modulates the transmitter-ready stream, and advantageously performs a wireless network transmission process to propagate a broadcast stream to remote TV 158, remote controller 310, auxiliary base station 410, or any other compatible receiver device, in accordance with the present invention.

Figure 9:
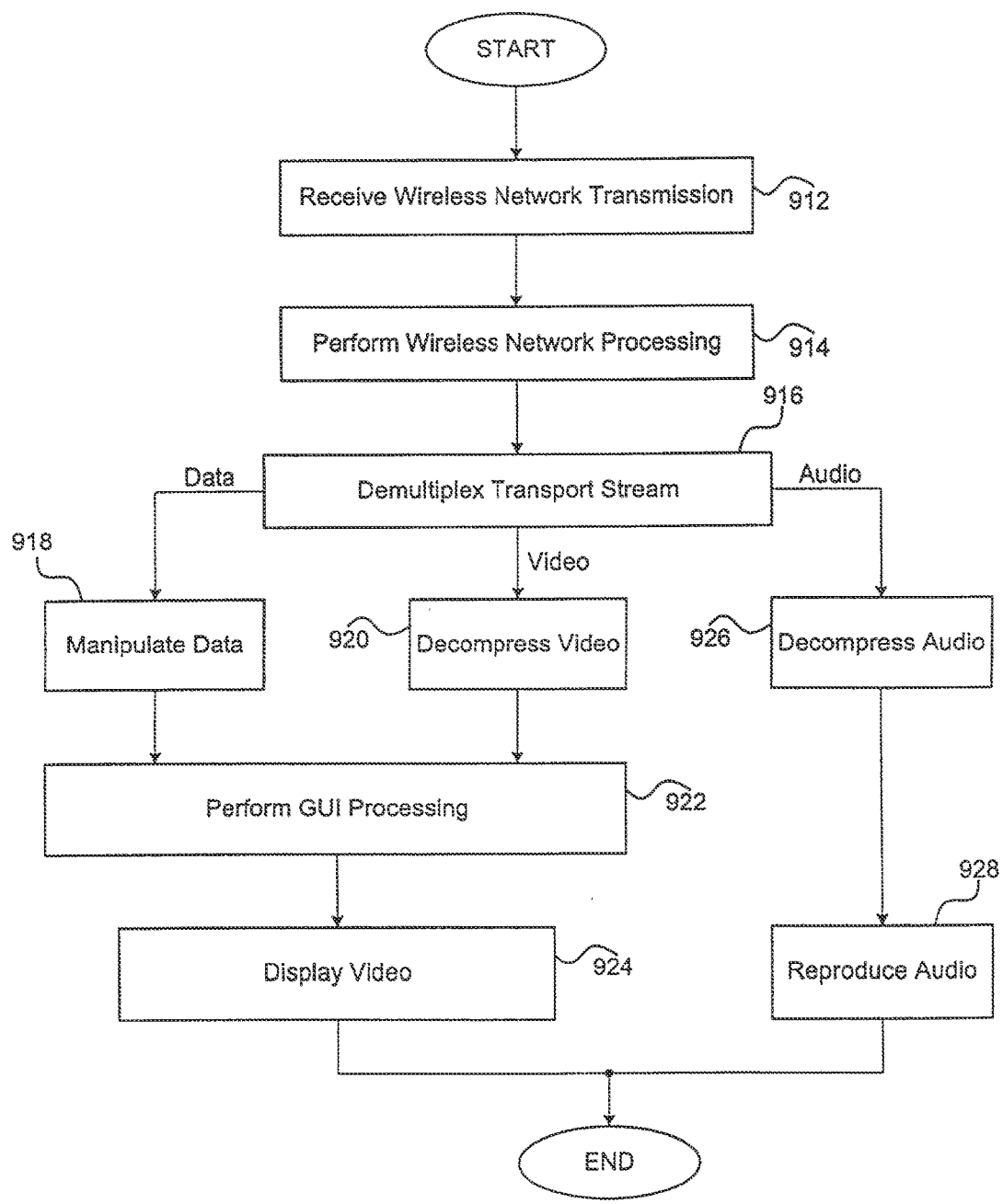
FIG. 9 is a flowchart of method steps for performing a wireless reception procedure, in accordance with one embodiment of present invention.

Referring now to FIG. 9, a flowchart of method steps for performing a wireless reception procedure is shown, in accordance with one embodiment of present invention. For reasons of clarity, the FIG. 7 wireless reception procedure is discussed in reference to remote TV 158. However, wireless reception by remote controller 310, auxiliary base station 410, or any other compatible receiver device is equally contemplated for use in conjunction with the present invention.

In the FIG. 9 embodiment, initially, in step 912, remote TV 158 preferably receives a broadcast stream from wireless base station 156. Then, in step 914, RF subsystem 724 preferably performs a wireless network processing procedure to generate a baseband stream. The foregoing wireless network processing procedure may include various appropriate techniques, such as demodulation and down-conversion of the broadcast stream propagated from wireless base station 156.

In step 916, A/V decoder 732 preferably receives and demultiplexes the baseband stream into separate components which may include separate data, video, and audio information. If the baseband stream includes data information, then, in step 918, A/V decoder 732 preferably manipulates the data information into an appropriate format to generate manipulated data, and the FIG. 9 process advances to step 922. Similarly, if the baseband stream includes video information, then, in step 920, A/V decoder 732 preferably decompresses the video information to generate decompressed video, and the FIG. 9 process advances to step 922.

In addition, if the baseband stream includes audio information, then in step 926, A/V decoder 732 preferably decompresses the audio information to generate decompressed audio. In step 928, A/V decoder 732 may preferably provide the decompressed audio to an amplifier and speakers which operate to aurally reproduce the decompressed audio.

In step 922, display controller 736 preferably may access the manipulated data (step 918) and the decompressed video (step 920), and responsively perform a graphical user interface (GUI) processing procedure to generate display data and display video for presentation on remote TV 158. Finally, in step 924, display controller 736 provides the display data and the display video to remote TV screen 212 for viewing by a user of wireless television system 110.

The present invention therefore implements a flexible wireless television system that a user may effectively utilize in a wide variety of applications. For example, a video camera device may generate a wireless transmission to remote TV 158 for purposes such as surveillance and monitoring, or the transmission can be received by wireless base station 156 and the transmission stored on a connected storage device. Remote TV 158 may also generate a query to wireless television system 110 for purposes such as determining current programming of VCR 126. A user may likewise receive a telephone communication via remote TV 158 while simultaneously viewing a caller ID display, or may similarly utilize wireless television system to interact with an Internet browser program.

In addition, a viewer may flexibly utilize wireless television system 110 for displaying information from a home server (such as viewing a personal recipe collection while cooking), for displaying various user profiles (such as a particular viewer's favorite television channels), or for sequencing through images in a "picture frame" mode when remote TV 158 is not otherwise in use. Therefore, the present invention effectively implements a flexible wireless television system that utilizes various heterogeneous components to facilitate optimal system interoperability and functionality.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system to provide television programming to a remotely-located display system via a local area network, the system comprising:
   a television receiver to receive and decode the television programming and to generate program information that represents the received and decoded television programming in a digital high definition television format that is suitable for display on a television;
   a base station configured to receive the program information in the digital high definition television format that is suitable for presentation on a television and to perform a network processing procedure in which the television programming is transcoded from the digital high definition television format that is suitable for display on a television to produce an output stream of data packets for transmission on the local area network, wherein the output stream of data packets represents the television programming as a packetized video stream that has a different bit rate that is lower than a bit rate of the digital high definition television format suitable for display on the television; and
   a network interface configured to transmit the output stream of data packets over the network to the remotely-located display system.

2. The system of claim 1, wherein the base station is configured to receive control information from the remotely-located display system via the network interface, and wherein the base station is configured to control the program information provided by the television receiver based on the control information.

3. The system of claim 1, wherein the base station is configured to receive control information from the remotely-located display system via the network interface, and wherein the base station is configured to select a different program source other than the television receiver for providing program information in the digital television format responsive to receiving the control information.

4. The system of claim 1, wherein the network interface is configured to transmit the output stream of data packets over a wired connection to a wireless transmitter, and the wireless transmitter is configured to transmit the output stream of data packets to the remotely-located display system at least in part over a wireless network.

5. The system of claim 1, wherein the network processing procedure formats the output stream in accordance with a type of bus arbitration that is compatible with the local area network.

6. The system of claim 1, wherein the local area network comprises a packet-switched network and wherein the network processing procedure formats the output stream for transmission over the packet-switched network.

7. The system of claim 1 wherein the network processing procedure depends upon a type of bus arbitration required for the network interface.

8. The method of claim 1 wherein the digital high definition television format that is suitable for display on a television is a high bandwidth format, and wherein the network processing procedure comprises down converting the bit rate of the high bandwidth format.

9. A system for implementing a television system, the system comprising:
a television receiver configured to receive and decode television programming and to generate program information, and to provide the program information in a digital high definition television format that is suitable for display on a television; and
a base station coupled to the television receiver, the base station comprising a processor configured to receive, from the television receiver, and responsively process the program information in the digital high definition television format that is suitable for television to provide an output stream of data packets in which the program information is transcoded from the digital high definition television format that is suitable for viewing on a television to a packetized format that is compatible with transmission on a local area network, wherein the packetized format represents the program information as a video stream that has a lower bit rate than the high definition digital television format suitable for display on the television, the base station further comprising a network interface to transmit the output stream of data packets over the local area network to a remotely-located display device for playback of the program information on the display device.

10. The system of claim 9 further comprising a wireless transmitter configured to receive the output stream of data packets from the base station and to propagate the output stream of data packets over a wireless network to the remotely-located display device.

11. The system of claim 9 wherein the base station performs a network processing procedure on the program information received in the high definition digital television format to create the output stream of data packets in the packetized format that is compatible with transmission on the local area network.

12. The system of claim 11 wherein the network processing procedure formats the output stream of data packets using a type of bus arbitration used by the network interface.

13. The system of claim 11, wherein the base station is configured to receive control information from the remotely-located display system via the network interface, and wherein the base station is configured to control the program information provided by the program source based on the control information.

14. The system of claim 11, wherein the base station is configured to receive control information from the remotely-located display system via the network interface, and wherein the base station is configured to select a different program source other than the television receiver for providing program information responsive to receiving the control information.

15. A method executable by a base station to provide television programming over a local area network, the method comprising:
receiving the television programming at the base station from a television receiver in a digital high definition television format that is suitable for viewing on a television, wherein the television programming is received and decoded by the television receiver prior to transmission to the base station;
processing the received television programming by the base station to transcode the television programming from the digital high definition television format that is suitable for display on a television to an output stream of data packets for transmission on a network, wherein the output stream encodes the television programming received from the television receiver in a packetized format that is compatible with the local area network and wherein the packetized format represents the television programming as a video stream that has a lower bit rate than the digital high definition television format suitable for display on the television; and
transmitting the output stream containing the television programming in the packetized format to a remotely-located display system for playback of the program information by the remotely-located display system, wherein the output stream is transmitted in the packetized format via the local area network.

16. The method of claim 15 wherein the processing depends upon a type of bus arbitration required by the local area network.

17. The method of claim 15 further comprising receiving control information from the remotely-located display system via the local area network, and controlling the program information provided by the television receiver based on the control information.

18. The method of claim 15 further comprising receiving control information from the remotely-located display system via the local area network, and selecting a different program source other than the television receiver for providing program information responsive to receiving the control information.

19. The method of claim 15 wherein the processing formats the packetized format in accordance with a type of bus arbitration used by the local area network.

20. The method of claim 15 wherein the output stream in the packetized format is transmitted in accordance with a type of bus arbitration used by the local area network.

\* \* \* \* \*